United States Patent
Pal et al.

(10) Patent No.: US 12,553,034 B2
(45) Date of Patent: Feb. 17, 2026

(54) UNIFIED IN-VITRO PROCESS FOR OBTAINING LUNG CELLS FROM PLURIPOTENT STEM CELLS

(71) Applicant: Eyestem Research Private Limited, Ahmedabad (IN)

(72) Inventors: Rajarshi Pal, Bengaluru (IN); Harshini Bava Surendran, Bangalore (IN); Mohanapriya Rajamoorthy, Tamil Nadu Dharmapuri (IN)

(73) Assignee: EYESTEM RESEARCH PRIVATE LIMITED, Ahmedabad (IN)

( * ) Notice: Subject to any disclaimer, the term of this patent is extended or adjusted under 35 U.S.C. 154(b) by 1148 days.

(21) Appl. No.: 17/439,714

(22) PCT Filed: Nov. 5, 2020

(86) PCT No.: PCT/IN2020/050933
§ 371 (c)(1),
(2) Date: Sep. 15, 2021

(87) PCT Pub. No.: WO2021/090333
PCT Pub. Date: May 14, 2021

(65) Prior Publication Data
US 2022/0162563 A1    May 26, 2022

(30) Foreign Application Priority Data
Nov. 5, 2019   (IN) .............................. 201921044947

(51) Int. Cl.
*C12N 5/071*    (2010.01)
(52) U.S. Cl.
CPC ...... *C12N 5/0688* (2013.01); *C12N 2501/115* (2013.01); *C12N 2501/119* (2013.01);
(Continued)

(58) Field of Classification Search
CPC ............ C12N 5/0688; C12N 2501/115; C12N 2501/119; C12N 2501/155;
(Continued)

(56) References Cited

U.S. PATENT DOCUMENTS

| | | | |
|---|---|---|---|
| 2012/0100110 A1 | 4/2012 | Turovets et al. | |
| 2016/0068816 A1* | 3/2016 | Osafune | C12N 5/0688 435/325 |
| 2016/0168535 A1* | 6/2016 | Snoeck | C12N 5/0603 435/377 |

OTHER PUBLICATIONS

Huang et al. Efficient generation of lung and airway epithelial cells from human pluripotent stem cells. Nat Biotechnol. Jan. 2014;32(1):84-91. (Year: 2014).*

(Continued)

*Primary Examiner* — Marcia S Noble
*Assistant Examiner* — Briana N Ebbinghaus
(74) *Attorney, Agent, or Firm* — Panitch Schwarze Belisario & Nadel LLP

(57) ABSTRACT

Disclosed is an in-vitro protocol for differentiating human induced pluripotent stem cells (hiPSCs) or human embryonic stem cells (hESC) to give rise to a definitive endoderm, followed by progression into anteriorized foregut endoderm that has the ability to give rise to both proximal and distal lung epithelial cells. The protocol not only offers great opportunities for the study of human development but also have tremendous potential for future clinical cell-based therapies. The protocol outlined here is used to differentiate hiPSCs into lung epithelial cell types through a process that faithfully recapitulates the stepwise events observed in-vivo. The was followed with the working cell bank of an hiPSC line made under current Good Manufacturing Practice (cGMP) conditions, a necessary step for the future clinical application of these cells.

15 Claims, 11 Drawing Sheets
(Continued)

Proximal airway epithelial cells - Scanning EM

Distal alveolar cells - Transmission EM (9 of 11 Drawing Sheet(s) Filed in Color)

Specification includes a Sequence Listing.

(52) U.S. Cl.
CPC .... *C12N 2501/155* (2013.01); *C12N 2501/16* (2013.01); *C12N 2501/415* (2013.01); *C12N 2501/727* (2013.01); *C12N 2506/45* (2013.01); *C12N 2533/90* (2013.01)

(58) Field of Classification Search
CPC .......... C12N 2501/16; C12N 2501/415; C12N 2501/727; C12N 2506/45; C12N 2533/90
See application file for complete search history.

(56) References Cited

OTHER PUBLICATIONS

Huang et al. The in vitro generation of lung and airway progenitor cells from human pluripotent stem cells. Nat Protoc. Mar. 2015;10(3):413-25. Epub Feb. 5, 2015. (Year: 2015).*
Costar® 6-well Clear Flat Bottom Ultra-Low Attachment Multiple Well Plates, Individually Wrapped, Sterile. Corning. (accessed at: https://ecatalog.corning.com/life-sciences/b2c/US/en/Microplates/Assay-Microplates/96-Well-Microplates/Costar%C2%AE-Multiple-Well-Cell-Culture-Plates/p/3471) (Year: 2025).*
MEM Non-Essential Amino Acids Solution (100X). ThermoFisher Scientific. (accessed at: https://web.archive.org/web/20151005000346/https://www.thermofisher.com/order/catalog/product/11140050)(Year: 2015).*
AlbuMAX® I and AlbuMAX® II. Gibco by Life technologies. (accessed at: https://assets.thermofisher.com/TFS-Assets/LSG/manuals/3117.pdf) (Year: 2014).*
Banerjee, et al., "Long Noncoding RNA RP11-380D23.2 Drives Distal-Proximal Patterning of the Lung by Regulating PITX2 Expression," Stem Cells, vol. 36(2), pp. 218-229 (2018).
Baghbaderani, et al., "Detailed Characterization of Human Induced Pluripotent Stem Cells Manufactured for Therapeutic Applications," Stem Cell Rev and Rep, 12:394-420 (2016).
Shafa, et al., "Human-Induced Pluripotent Stem Cells Manufactured Using a Current Good Manufacturing Practice-Compliant Process Differentiate Into Clinically Relevant Cells From Three Germ Layers," Frontiers in Medicine, vol. 5, Article 69 (2018).
Rao, et al., "Illustrating the potency of current Good Manufacturing Practice-compliant induced pluripotent stem cell lines as a source of multiple cell lineages using standardized protocols," Cytotherapy, vol. 20, Issue 6 (2018).
Leahy, et al., "Use of Developmental Marker Genes to Define Temporal and Spatial Patterns of Differentiation During Embryoid Body Formation," Journal of Experimental Zoology, 284:67-81 (1999).
Surendran, et al., "Generation of Transplantable Retinal Pigmented Epithelial (RPE) Cells for Treatment of Age-Related Macular Degeneration (AMD)," Methods in Molecular Biology (2018).
Herriges et al., "Lung development: orchestrating the generation and regeneration of a complex organ," Development, vol. 141, pp. 502-513 (2014).
Morrisey et al., "Molecular Determinants of Lung Development," AnnalsATS, vol. 10, No. 2, pp. S12-S16 (2013).
Rankin et al., "Gene Regulatory Networks Governing Lung Specification," Journal of Cellular Biochemistry, vol. 115, pp. 1343-1350 (2014).
Dye et al, "In vitro generation of human pluripotent stem cell derived lung organoids," eLife, vol. 4, p. e05098 (2015).
Int'l Search Report and Written Opinion issued Mar. 11, 2021 in Int'l Application No. PCT/IN2020/050933.
Jacob et al, "Differentiation of Human Pluripotent Stem Cells into Functional Lung Aveolar Epithelial Cells," Cell Stem Cell, vol. 21, No. 4, pp. 472-488 (2017).
Wong et al, "Generation of Lung Epithelium from Pluripotent Stem Cells," Current Pathobiology Reports, vol. 1, No. 2, pp. 137-145 (2013).
Product Information for DMEM/F-12 from Sigma-Aldrich, Downloaded Jun. 11, 2025.
Product Information for DMEM/F-12 from ThermoFisher, Downloaded Jun. 11, 2025.
Green et al., "Generation of anterior foregut endoderm from human embryonic and induced pluripotent stem cells," Nature Biotechnology, vol. 29, No. 3, pp. 267-272 plus one page (2011).

* cited by examiner

Definitive Endoderm (DE)        Anteriorized Endoderm (AE)

Proximal airway epithelial cells - Scanning EM

Distal alveolar cells - Transmission EM

UNIFIED IN-VITRO PROCESS FOR OBTAINING LUNG CELLS FROM PLURIPOTENT STEM CELLS

CROSS-REFERENCE TO RELATED APPLICATIONS

This application is a Section 371 of International Application No. PCT/IN2020/050933, filed Nov. 5, 2020, which was published in the English language on May 14, 2021, under International Publication No. WO 2021/090333 A1, and which claims priority under 35 U.S.C. § 119 (b) to Indian Application No. 201921044947, filed Nov. 5, 2019, the disclosures of which are incorporated herein by reference in their entirety.

REFERENCE TO SEQUENCE LISTING SUBMITTED ELECTRONICALLY

This application contains a sequence listing, which is submitted electronically via EFS-Web as an ASCII formatted sequence listing with a file name "689370_20US_Sequence Listing", creation date of Sep. 15, 2021, and having a size of about 5 KB. The sequence listing submitted via EFS-Web is part of the specification and is herein incorporated by reference in its entirety.

FIELD OF INVENTION

The present disclosure broadly relates to the field of stem cell culture. In particular, the present disclosure discloses an in-vitro unified method for obtaining proximal lung epithelial cells and distal lung epithelial cells from human induced pluripotent stem cells (hiPSCs) or human embryonic stem cells (hESCs).

BACKGROUND OF THE INVENTION

Lungs are an important respiratory organ, helping in waste management of the human body. This complex organ is essential for the ability of terrestrial life to eliminate $CO_2$ in exhaled air. Statistics of a study conducted by WHO (2007) indicate that more than 3 million people die every year due to the respiratory disorder called chronic obstructive pulmonary disorder (COPD), and 235 million people suffer from asthma. The reason behind this massive mortality and morbidity rate is stated to be ignorance about lung diseases. The majority of the people suffering from these conditions would never have had their lung function tested before the disease progressed to a severe state. Moreover, there is presently no cure for these disorders, and hence chronic lung issues continue to present a major health concern and are an underestimated burden on society.

Also, a practical model is required for a better understanding of such complex disorders which claims a lot of lives. Lung development takes place through five distinct phases: (1) embryonic phase, where the trachea bud branches off from the foregut endoderm; (2) pseudo-glandular phase, where lung buds develop into bronchioles containing blood capillaries; (3) canalicular phase, wherein an air-blood barrier develops to enable $O_2/CO_2$ exchange; (4) saccular phase, when a surfactant preventing lung damage develops; and (5) alveolar phase, marking the growth of bronchioles and air sacs/alveoli that continues even after childhood. The different phases are tightly orchestrated and regulated by various signalling pathways such as FGF, EGF, TGF superfamily, WNT, retinoic acid, Hedgehog, and Notch (Herriges & Morrisey, 2014 *Development*, 141, 502-513; Morrisey et al., 2013 *Annals of the American Thoracic Society*, 10(2), S12-6; Rankin & Zorn, 2014 *Journal of Cellular Biochemistry*, 115, 1343-1350.). Understanding the complex interplay of transcription factors (TFs) and related signalling pathways is crucial for successful and effective differentiation into lung epithelium.

Although there are various protocols that are available for differentiating the stem cells to obtain lung cells, however, there is a knowledge gap in designing a robust and efficient protocol for developing lung epithelial cells.

SUMMARY OF INVENTION

In an aspect of the present disclosure, there is provided an in-vitro process for obtaining proximal lung epithelial cells and distal lung epithelial cells from human pluripotent stem cells, said process comprising: (a) sub-culturing human pluripotent stem cells to obtain embryoid bodies in a suspension; (b) plating the embryoid bodies onto coated plates in presence of a definitive endoderm medium, and feeding the embryoid bodies with the definitive endoderm medium to obtain definitive endoderm cells; (c) culturing the definitive endoderm cells obtained in step (b) in presence of an anteriorization medium, to obtain bipotential anteriorized foregut endoderm cells; (d) culturing the bipotential anteriorized foregut endoderm cells of step (c) in presence of a proximal differentiation medium, to obtain proximal lung epithelial cells; and (e) culturing the bipotential anteriorized foregut endoderm cells of step (c) in presence of a distal differentiation medium, to obtain distal lung epithelial cells, wherein the distal lung epithelial cells has an ability to give rise to Type I and Type II alveolar epithelial cells.

In another aspect of the present disclosure, there is provided an in-vitro process for obtaining proximal lung epithelial cells and distal lung epithelial cells from human induced pluripotent stem cells, said process comprising: (a) sub-culturing human induced pluripotent stem cells to obtain embryoid bodies in a suspension; (b) plating the embryoid bodies onto coated plates in presence of a definitive endoderm medium, and feeding the embryoid bodies with the definitive endoderm medium to obtain definitive endoderm cells; (c) culturing the definitive endoderm cells obtained in step (b) in presence of an anteriorization medium, to obtain bipotential anteriorized foregut endoderm cells; (d) culturing the bipotential anteriorized foregut endoderm cells of step (c) in presence of a proximal differentiation medium, to obtain proximal lung epithelial cells; and (e) culturing the bipotential anteriorized foregut endoderm cells of step (c) in presence of a distal differentiation medium, to obtain distal lung epithelial cells, wherein the distal lung epithelial cells has an ability to give rise to Type I and Type II alveolar epithelial cells.

In another aspect of the present disclosure, there is provided an in-vitro process for obtaining proximal lung epithelial cells and distal lung epithelial cells from human embryonic stem cells (hESC), said process comprising: (a) obtaining hESC and sub-culturing the hESC to obtain embryoid bodies in a suspension; (b) plating the embryoid bodies onto coated plates in presence of a definitive endoderm medium (DE medium), and feeding the embryoid bodies with DE medium to obtain definitive endoderm cells (DE cells); (c) culturing the DE cells obtained in presence of an anteriorization medium, to obtain bipotential anteriorized foregut endoderm cells; (d) culturing the bipotential anteriorized foregut endoderm cells of step (c) in presence of a proximal differentiation medium, to obtain proximal lung epithelial cells; and (e) culturing the bipotential anteriorized foregut endoderm cells of step (c) in presence of a distal differentiation medium, to obtain distal lung epithelial cells, wherein the distal lung epithelial cells has an ability to give rise to Type I and Type II alveolar epithelial cells.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF ACCOMPANYING DRAWINGS

The patent or application file contains at least one drawing executed in color. Copies of this patent or patent application publication with color drawings will be provided by the Office upon request and payment of the necessary fee.

The following drawings form a part of the present specification and are included to further illustrate aspects of the present disclosure. The disclosure may be better understood by reference to the drawings in combination with the detailed description of the specific embodiments presented herein.

Figure 3:
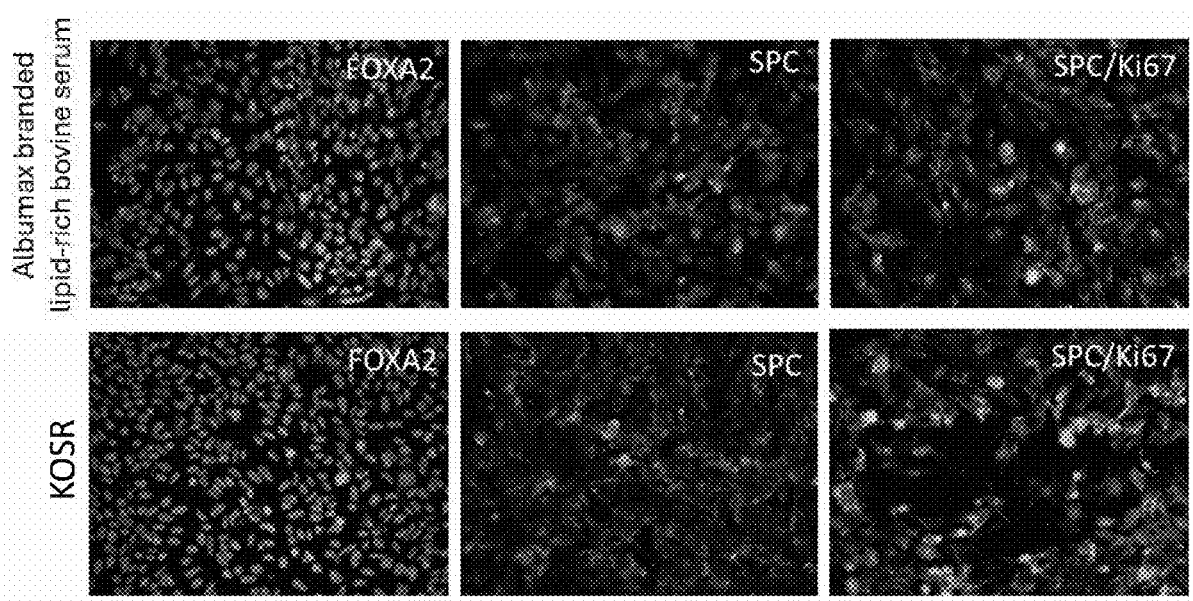

FIG. 3 depicts that the lung differentiation protocol as disclosed in the present disclosure, can be optimized using Knock Out branded Serum Replacement (KOSR) compared to Albumax branded lipid-rich bovine serum. Key markers like FOXA2 and SPC are expressed in stage II lung epithelial cells derived from the NCL1 iPSC; presence of Ki67 indicates that cells at this stage are still undergoing proliferation to some extent, in accordance with an embodiment of the present disclosure.

Figure 4:
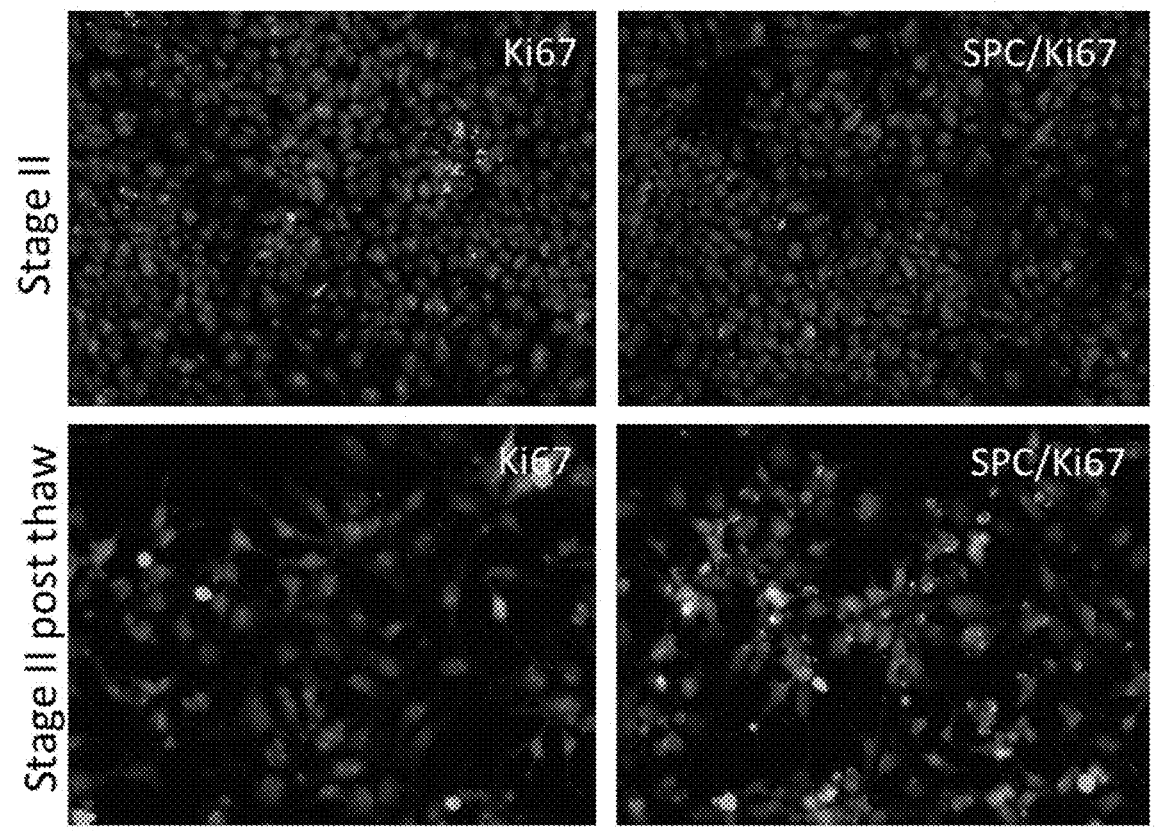

FIG. 4 depicts that lung epithelial cells generated by the protocol of the present disclosure can undergo freeze-thaw. Stage II NCL2 iPSC derived lung progenitors show similar morphology and marker expression before and after freezing. Ki67 is a proliferation marker whereas SPC is a lung alveolar epithelial cell marker, in accordance with an embodiment of the present disclosure.

Figure 5:
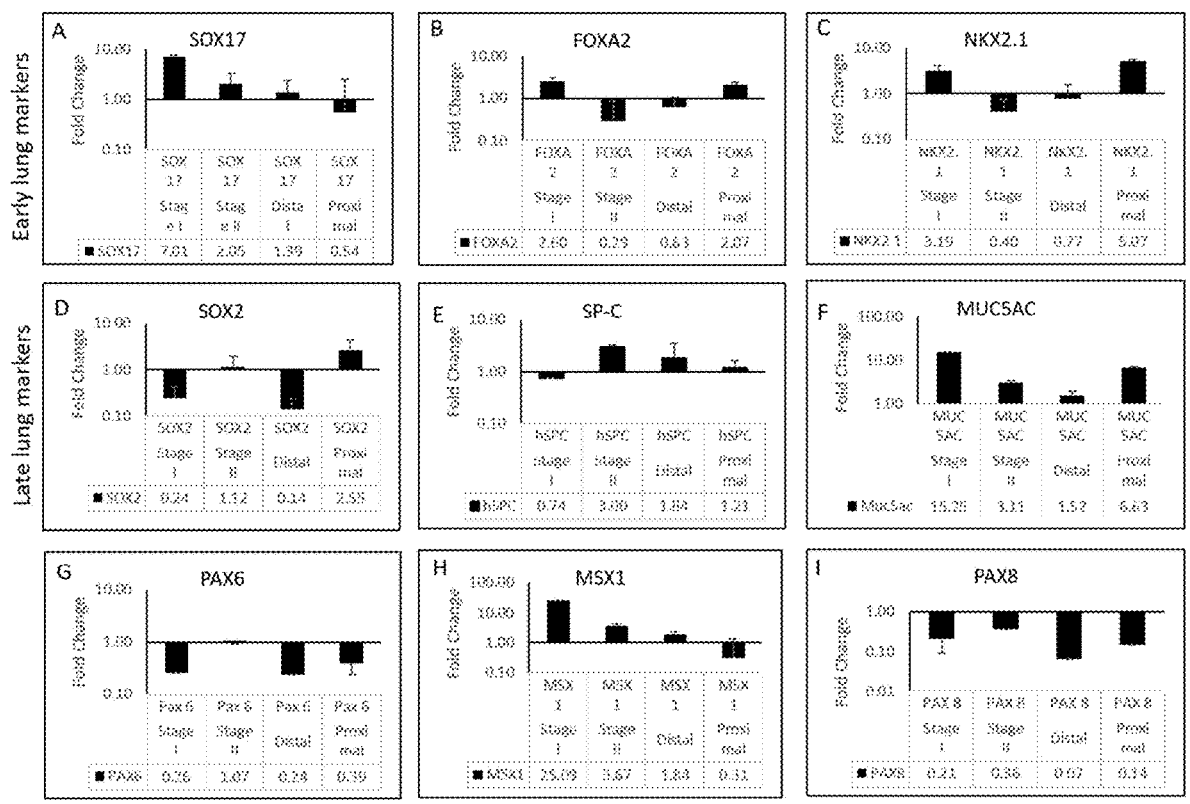

FIG. 5 demonstrates by real-time PCR that the lung differentiation protocol of the present disclosure simulates the gene signature of in-vivo lung development via high expression of early and late lung epithelial cell markers, in accordance with an embodiment of the present disclosure.

Figure 6:
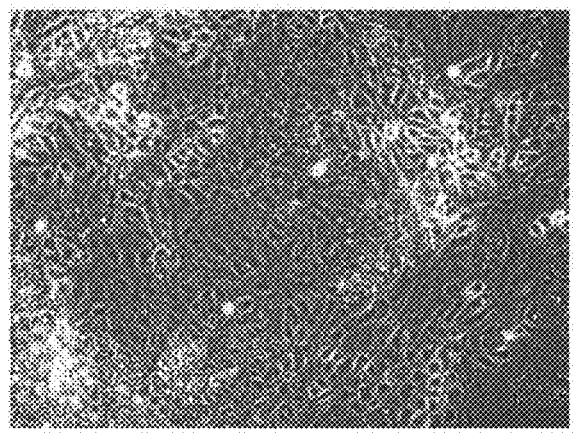
Figure 6:
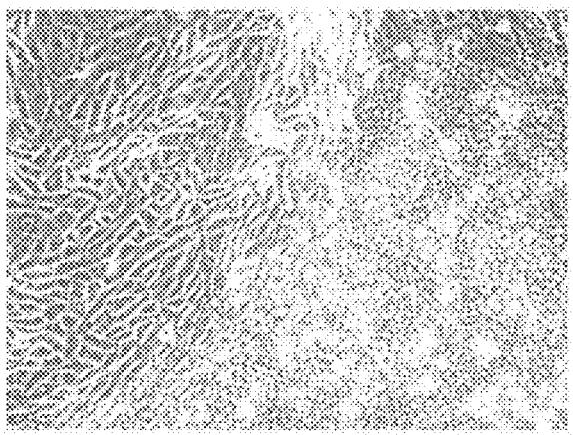
Figure 6:
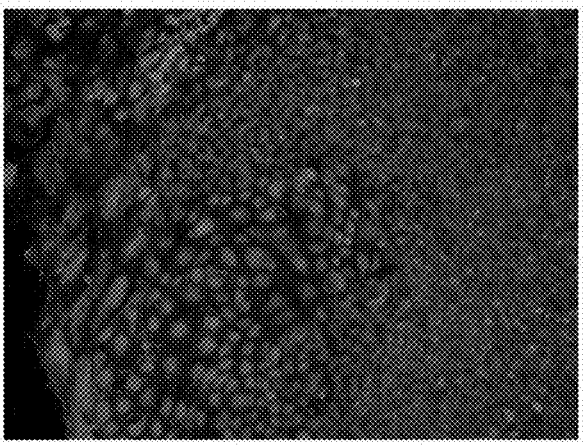
Figure 6:
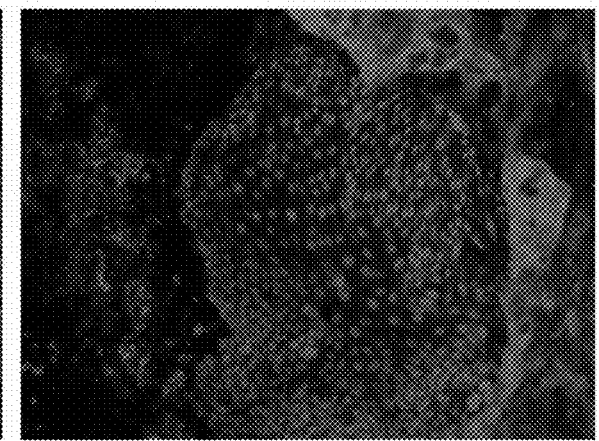

FIG. 6 depicts the bipotential lung progenitors obtained from using the cell line TC-1133 iPSC as a starting point, in accordance with an embodiment of the present disclosure.

Figure 7:
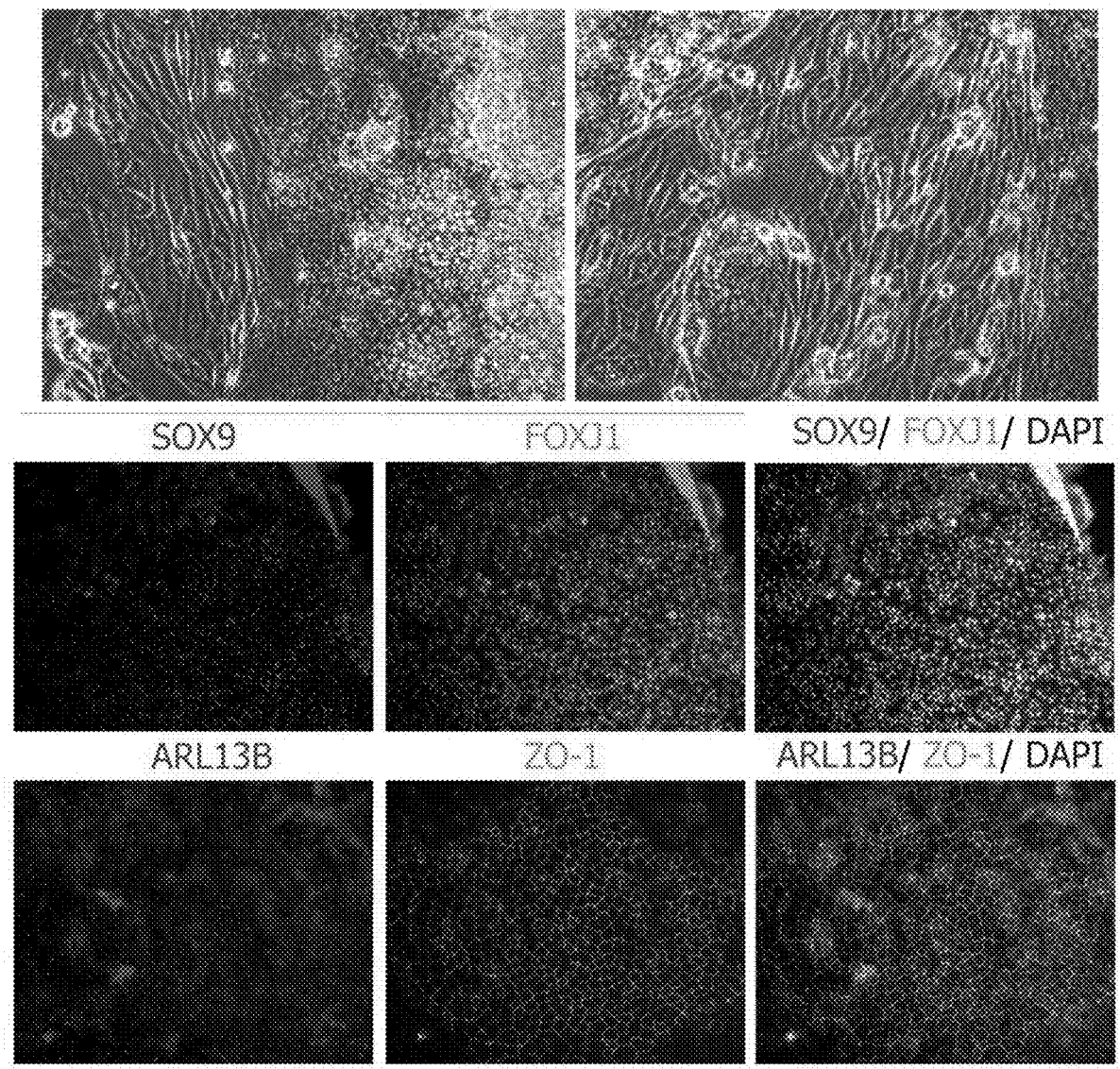

FIG. 7 depicts the formation of proximal airway epithelial cells obtained from bipotential AE lung progenitors by using TC-1133 as the starting point, in accordance with an embodiment of the present disclosure.

Figure 8:
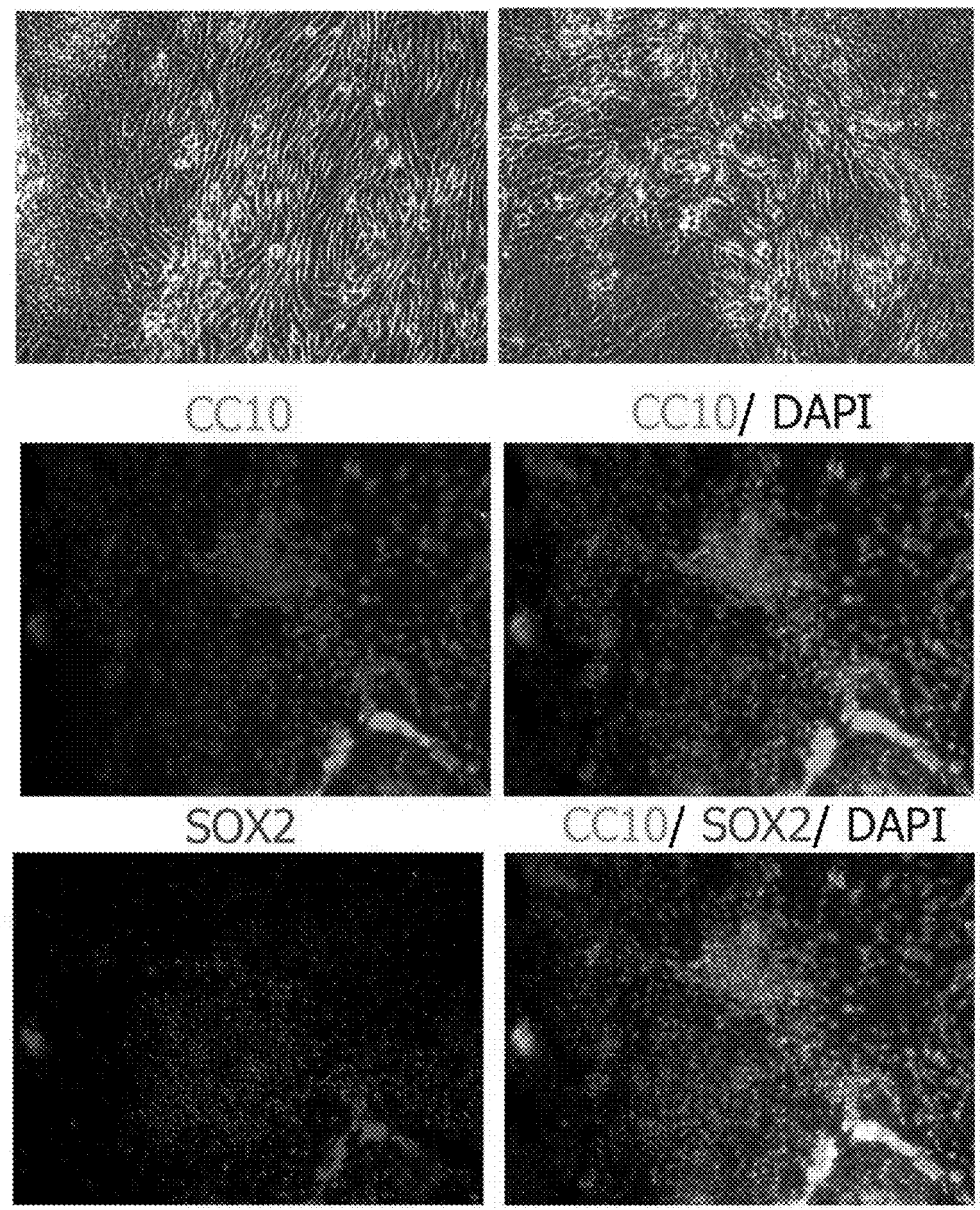

FIG. 8 depicts the formation of distal alveolar cells obtained from bipotential AE lung progenitors by using TC-1133 as the starting point, in accordance with an embodiment of the present disclosure.

Figure 9:
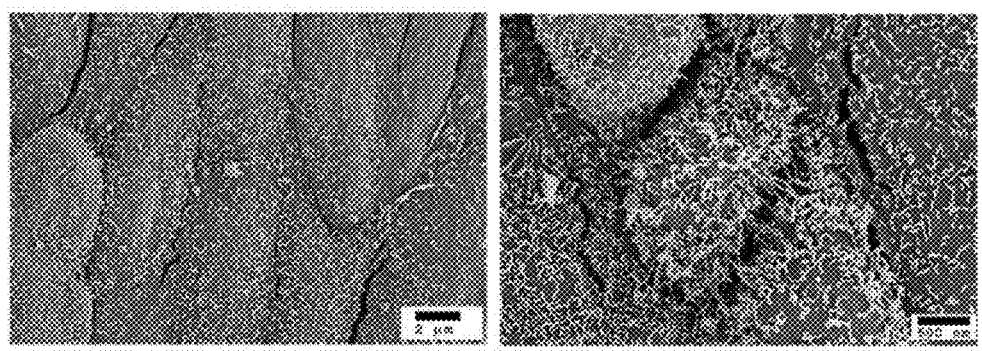
Figure 9:
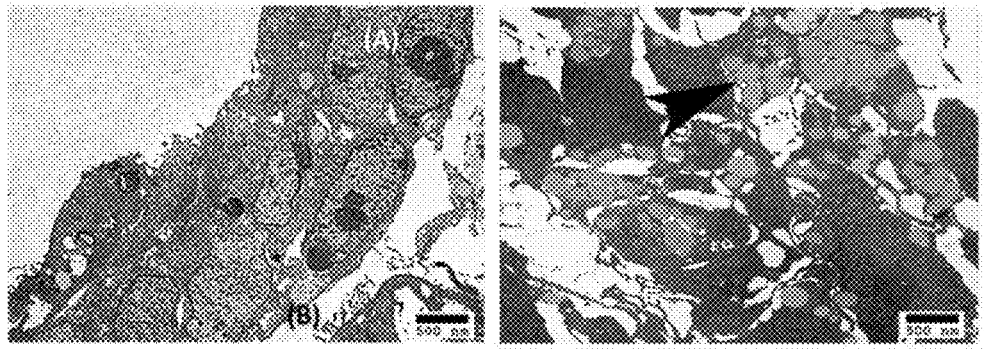

FIG. 9 depicts the electron microscopic images of proximal airway epithelial cells and distal alveolar cells obtained from bipotential AE lung progenitors by using TC-1133 as the starting point, in accordance with an embodiment of the present disclosure.

Figure 10:
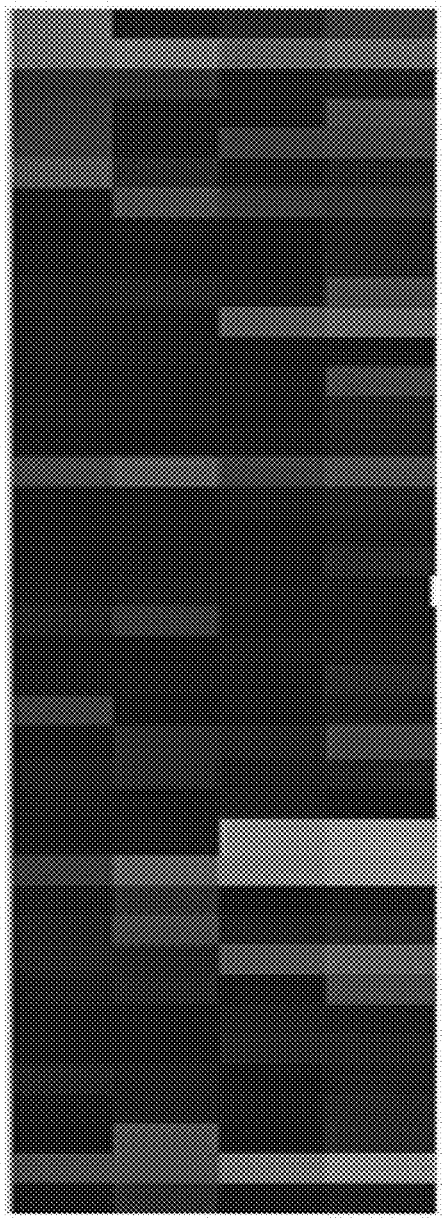

FIG. 10 depicts the mRNA sequencing analysis showing fold change for key lung development genes represented as heat map across various stages of differentiation starting from undifferentiated iPSCs (TC-1133), in accordance with an embodiment of the present disclosure.

Figure 11:
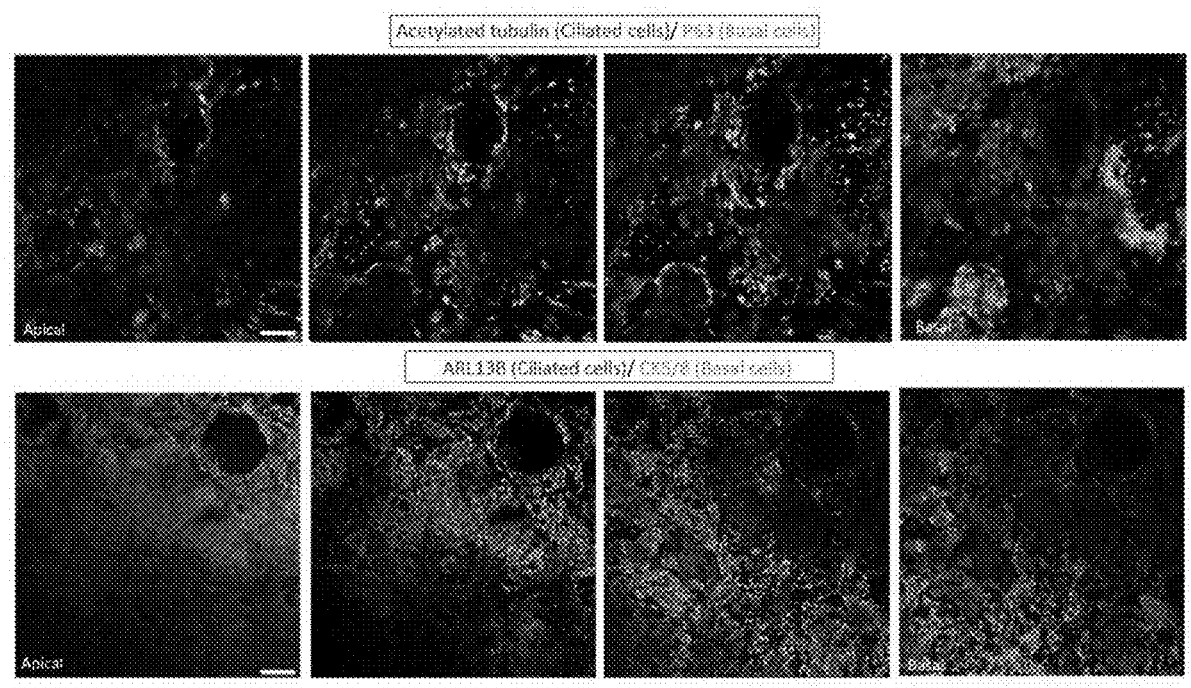

FIG. 11 depicts the air liquid interface cultures of proximal airway epithelial cells obtained by using TC-1133 iPSCs as the starting point, in accordance with an embodiment of the present disclosure.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "xeno-free" is used to denote a process or a substrate which is free from any animal-derived product. The term "unified" indicates that by using a single or unified protocol, the present disclosure produces lung epithelial cells of the airway and alveolar, the two compartments of the lung from a common precursor population. The term "pluripotent stem cells (PSC)" refer to pluripotent stem cells are cells that have the capacity to self-renew by dividing and to develop into the three primary germ cell layers of the early embryo. The process as described in the present disclosure can be followed for human pluripotent stem cells which can be either human-induced pluripotent stem cells or human embryonic stem cells. The term "in vitro" is used to refer to any environment apart from the native environment, it generally refers to an artificial environment that is not the same as the native environment. The term "definitive endoderm medium" refers to the medium as described in the present disclosure which is used to obtain definitive endoderm cells from the embryoid bodies. The term "anteriorization medium" refers to the medium which is used in the process as per the present disclosure to culture the definitive endoderm cells to obtain bipotential anteriorized foregut endoderm cells. The term "proximal differentiation medium" refers to the medium which is used in the process as per the present disclosure to culture the bipotential anteriorized foregut endoderm cells to obtain proximal lung epithelial cells. The term "distal differentiation medium" refers to the medium which is used in the process as per the present disclosure to culture the bipotential anteriorized foregut endoderm cells to obtain distal lung epithelial cells. The terms "sub-culturing", and "culturing" as used in the present disclosure refers to the well-known terminologies used in the field of the invention to which the disclosure belongs. The term "CTS knockout branded serum replacement" refers to a GMP compliance xeno-free product which can be obtained from Thermo Fisher for use in the process of the present disclosure.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

As discussed in the background section, there is a requirement for a protocol or a method for obtaining lung epithelial cells from stem cells. The present disclosure discloses a protocol for obtaining lung epithelial cells from pluripotent stem cells. Pluripotent stem cells disclosed in the present disclosure are human induced pluripotent stem cells (hiPSCs) and human embryonic stem cells (hESCs) from which the unified protocol has been designed. Further, the present disclosure discloses a protocol for obtaining lung epithelial cells from human induced pluripotent stem cells (hiPSC) as well as from human embryonic stem cells (hESC). The method as disclosed in the present disclosure, is robust, consistent, and efficient. Cultures are taken through a series of steps, carefully mimicking in-vivo organogenesis. hiPSCs are cultured according to a previously described method (Banerjee et al., 2018, *Stem Cells*, 36(2), 218-229). The iPSCs are allowed to form cell masses or aggregates called embryoid bodies (EB) in suspension. The EBs have the capacity to form all three germinal lineages of the human embryo: namely ectoderm, mesoderm, and endoderm. Lung arises from the endodermal layer of embryo. Major steps in lung differentiation include formation of definitive endoderm, anteriorization of the foregut endoderm, and specification of proximal and distal lung epithelial cells. EBs are exposed to endoderm fate-determining factors, then resulting lung precursors, are further promoted and induced to become proximal as well as distal lung epithelial cells. By using the method as disclosed in the present disclosure, authentic proximal and distal lung progenitors representing both airway and alveolus can be generated in large numbers without genetically manipulating iPSC, thereby, facilitating further prospects.

In an embodiment of the present disclosure, there is provided an in-vitro process for obtaining proximal lung epithelial cells and distal lung epithelial cells from human induced pluripotent stem cells, said process comprising: (a) sub-culturing human induced pluripotent stem cells to obtain embryoid bodies in a suspension; (b) plating the embryoid bodies onto coated plates in presence of a definitive endoderm medium, and feeding the embryoid bodies with the definitive endoderm medium to enable formation of epithelial progenitor pockets from boundaries of the embryoid bodies to obtain definitive endoderm cells; (c) culturing the definitive endoderm cells obtained in step (b) in presence of an anteriorization medium, to obtain bipotential anteriorized foregut endoderm cells; (d) culturing the bipotential anteriorized foregut endoderm cells of step (c) in presence of a proximal differentiation medium, to obtain proximal lung epithelial cells; and (e) culturing the bipotential anteriorized foregut endoderm cells of step (c) in presence of a distal differentiation medium, to obtain distal lung epithelial cells, wherein the distal lung epithelial cells has an ability to give rise to Type I and Type II alveolar epithelial cells.

In an embodiment of the present disclosure, there is provided an in-vitro unified process for obtaining proximal lung epithelial cells and distal lung epithelial cells from human embryonic stem cells (hESC), said process comprising: (a) obtaining hESC and sub-culturing the hESC to obtain embryoid bodies in a suspension; (b) plating the embryoid bodies onto xeno-free plates in presence of a definitive endoderm medium (DE medium), and feeding the embryoid bodies with DE medium to obtain definitive endoderm cells (DE cells); (c) culturing the DE cells obtained in presence of an anteriorization medium, to obtain bipotential anteriorized foregut endoderm cells; (d) culturing the bipotential anteriorized foregut endoderm cells of step (c) in presence of a proximal differentiation medium, to obtain proximal lung epithelial cells; and (e) culturing the bipotential anteriorized foregut endoderm cells of step (c) in presence of a distal differentiation medium, to obtain distal lung epithelial cells, wherein the distal lung epithelial cells has an ability to give rise to Type I and Type II alveolar epithelial cells.

In an embodiment of the present disclosure, there is provided an in-vitro process for obtaining proximal lung epithelial cells and distal lung epithelial cells from human pluripotent stem cells, said process comprising: (a) sub-culturing human pluripotent stem cells to obtain embryoid bodies in a suspension; (b) plating the embryoid bodies onto coated plates in presence of a definitive endoderm medium, and feeding the embryoid bodies with the definitive endoderm medium to obtain definitive endoderm cells; (c) culturing the definitive endoderm cells obtained in step (b) in presence of an anteriorization medium, to obtain bipotential anteriorized foregut endoderm cells; (d) culturing the bipotential anteriorized foregut endoderm cells of step (c) in presence of a proximal differentiation medium, to obtain proximal lung epithelial cells; and (e) culturing the bipotential anteriorized foregut endoderm cells of step (c) in presence of a distal differentiation medium, to obtain distal lung epithelial cells, wherein the distal lung epithelial cells has an ability to give rise to Type I and Type II alveolar epithelial cells.

In an embodiment of the present disclosure, there is provided an in-vitro unified process for obtaining proximal lung epithelial cells and distal lung epithelial cells from human embryonic stem cells (hESC) as described herein, wherein the steps for obtaining proximal lung epithelial cells and distal lung epithelial cells from human embryonic stem cells (hESC) is same as that for obtaining proximal lung epithelial cells and distal lung epithelial cells from human induced pluripotent stem cells (hiPSCs) as described herein. It can be contemplated that in between the two processes, only the starting material is different.

In an embodiment of the present disclosure, there is provided an in-vitro process for obtaining proximal lung epithelial cells and distal lung epithelial cells from human pluripotent stem cells as described herein, wherein the coated plates are obtained by coating plates with at least one of the components selected from the group consisting of vitronectin, fibronectin, collagen, and laminin-521.

In an embodiment of the present disclosure, there is provided an in-vitro unified process for obtaining proximal lung epithelial cells and distal lung epithelial cells from human pluripotent stem cells as described herein, wherein the coated plates are obtained by coating plates with at least one of the components selected from the group consisting of vitronectin, fibronectin, and collagen.

In an embodiment of the present disclosure, there is provided an in-vitro unified process for obtaining proximal lung epithelial cells and distal lung epithelial cells from human pluripotent stem cells as described herein, wherein the definitive endoderm medium (DE medium) comprises of DMEM/F12, non-essential amino acids, B27, activin A in a concentration range of 100-200 ng/ml, and BMP-4 in a concentration range of 10-50 ng/ml. In another embodiment of the present disclosure, activin A in a concentration range of 120-180 ng/ml, and BMP-4 in a concentration range of 20-40 ng/ml. In yet another embodiment of the present disclosure, activin A in a concentration range of 140-175 ng/ml, and BMP-4 in a concentration range of 20-35 ng/ml.

In an embodiment of the present disclosure, there is provided an in-vitro unified process for obtaining proximal lung epithelial cells and distal lung epithelial cells from human pluripotent stem cells as described herein, wherein the definitive endoderm medium (DE medium) comprises albumax branded lipid-rich bovine serum.

In an embodiment of the present disclosure, there is provided an in-vitro unified process for obtaining proximal lung epithelial cells and distal lung epithelial cells from human pluripotent stem cells as described herein, wherein the definitive endoderm medium (DE medium) comprises KOSR.

In an embodiment of the present disclosure, there is provided an in-vitro unified process for obtaining proximal lung epithelial cells and distal lung epithelial cells from human pluripotent stem cells as described herein, wherein the definitive endoderm medium (DE medium) comprises CTS knockout branded serum replacement.

In an embodiment of the present disclosure, there is provided an in-vitro unified process for obtaining proximal lung epithelial cells and distal lung epithelial cells from human pluripotent stem cells as described herein, wherein the anteriorization medium comprises EGF in a concentration range of 10-75 ng/ml, FGF in a concentration range of 10-75 ng/ml, SB431542 in a concentration range of 1-10 µM, and Noggin in a concentration range of 10-50 ng/ml. In another embodiment of the present disclosure, SB431542 and Noggin is indicated as dual SMAD inhibition, wherein small molecules like LDN-193189, SU5402, CHIR99021 can also be used. In yet another embodiment of the present disclosure, EGF is in a concentration range of 20-60 ng/ml, FGF in a concentration range of 20-60 ng/ml, SB431542 in a concentration range of 2-7 µM, and Noggin in a concentration range of 20-40 ng/ml.

In an embodiment of the present disclosure, there is provided an in-vitro unified process for obtaining proximal lung epithelial cells and distal lung epithelial cells from human pluripotent stem cells as described herein, wherein the proximal differentiation medium comprises BMP7 in a concentration range of 10-75 ng/ml, FGF7 in a concentration range of 10-60 ng/ml, PD032519 in a concentration range of 10-75 ng/ml, All-trans retinoic acid in a concentration range of 10-75 ng/ml, Noggin in a concentration range of 10-75 ng/ml, and CHIR99021 in a concentration range of 1-10 µM. In another embodiment of the present disclosure, BMP7 is in a concentration range of 20-60 ng/ml, FGF7 is in a concentration range of 20-60 ng/ml, PD032519 is in a concentration range of 20-60 ng/ml, All-trans retinoic acid is in a concentration range of 20-60 ng/ml, Noggin is in a concentration range of 20-60 ng/ml, and CHIR99021 is in a concentration range of 2-8 µM.

In an embodiment of the present disclosure, there is provided an in-vitro unified process for obtaining proximal lung epithelial cells and distal lung epithelial cells from human pluripotent stem cells as described herein, wherein the distal differentiation medium comprises BMP2 in a concentration range of 10-75 ng/ml, BMP4 in a concentration range of 10-75 ng/ml, bFGF in a concentration range of 10-75 ng/ml, FGF10 in a concentration range of 10-75 ng/ml, and WNT3A in a concentration range of 10-75 ng/ml. In another embodiment, BMP2 is in a concentration range of 20-60 ng/ml, BMP4 is in a concentration range of 20-60 ng/ml, bFGF is in a concentration range of 20-60 ng/ml, FGF10 is in a concentration range of 20-60 ng/ml, and WNT3A is in a concentration range of 20-60 ng/ml.

In an embodiment of the present disclosure, there is provided an in-vitro unified process for obtaining proximal lung epithelial cells and distal lung epithelial cells from human pluripotent stem cells as described herein, wherein feeding the embryoid bodies with DE medium is done for a period of 5-10 days.

In an embodiment of the present disclosure, there is provided an in-vitro unified process for obtaining proximal lung epithelial cells and distal lung epithelial cells from human pluripotent stem cells as described herein, wherein culturing the DE cells in presence of an anteriorization medium is done for a period of 4-7 days. In another embodiment of the present disclosure, the DE cells are sub-cultured by harvesting the DE cells using accutase branded enzyme cell detachment solution/TrypLE branded enzyme solution and re-plating them in 1:1 or 1:2 ratio in the same media and on same ECM (freshly coated) so that they maintain growth in correct confluency within the stipulated induction time of 5-10 days because the cell density is very crucial for a good outcome.

In an embodiment of the present disclosure, there is provided an in-vitro unified process for obtaining proximal lung epithelial cells and distal lung epithelial cells from human pluripotent stem cells as described herein, wherein culturing the bipotential anteriorized foregut endoderm cells of step (c) in presence of a proximal differentiation medium is done for a period of 7-12 days.

In an embodiment of the present disclosure, there is provided an in-vitro unified process for obtaining proximal lung epithelial cells and distal lung epithelial cells from human pluripotent stem cells as described herein, wherein culturing the bipotential anteriorized foregut endoderm cells of step (c) in presence of a distal differentiation medium is done for a period of 7-12 days.

In an embodiment of the present disclosure, there is provided an in-vitro unified process for obtaining proximal lung epithelial cells and distal lung epithelial cells from human pluripotent stem cells as described herein, wherein the definitive endoderm cells obtained in step (b) expresses at least one of markers FOXA2, SOX17, and combinations thereof.

In an embodiment of the present disclosure, there is provided an in-vitro unified process for obtaining proximal lung epithelial cells and distal lung epithelial cells from human pluripotent stem cells as described herein, wherein the bipotential anteriorized foregut endoderm cells are positive for NKX2.1 and Ki67.

In an embodiment of the present disclosure, there is provided an in-vitro unified process for obtaining proximal lung epithelial cells and distal lung epithelial cells from human pluripotent stem cells as described herein, wherein the proximal lung epithelial cells are positive for at least three of markers FOXJ1, SOX2, SOX9, ZO-1, phallaoidin, ARL13B and combinations thereof.

In an embodiment of the present disclosure, there is provided an in-vitro unified process for obtaining proximal lung epithelial cells and distal lung epithelial cells from human pluripotent stem cells as described herein, wherein the distal lung epithelial cells are positive for at least three of markers SP-C, SP-B, FOXP2, SOX9, SOX2, CC10 and combinations thereof.

In an embodiment of the present disclosure, there is provided an in-vitro unified process for obtaining proximal lung epithelial cells and distal lung epithelial cells from human pluripotent stem cells as described herein, wherein the process leads to obtaining of at least 70-80% of proximal lung epithelial cells positive for SOX2, FOXJ1, and ZO-1.

In an embodiment of the present disclosure, there is provided an in-vitro unified process for obtaining proximal lung epithelial cells and distal lung epithelial cells from human pluripotent stem cells as described herein, wherein the process leads to obtaining of at least 70-80% of distal lung epithelial cells positive for SOX9, FOXP2, and SP-C.

In an embodiment of the present disclosure, there is provided an in-vitro unified process for obtaining proximal lung epithelial cells and distal lung epithelial cells from human pluripotent stem cells as described herein, wherein the coated plates are obtained by coating plates with at least one of the components vitronectin, fibronectin, and collagen, and wherein the definitive endoderm medium (DE medium) comprises KOSR instead of albumax branded lipid-rich bovine serum, and wherein the process is a xeno-free process.

In an embodiment of the present disclosure, there is provided an in-vitro unified process for obtaining proximal lung epithelial cells and distal lung epithelial cells from human pluripotent stem cells as described herein, wherein the bipotential anteriorized foregut endoderm cells obtained in step (c) are optionally harvested using TrypLE branded enzyme solution and cryopreserved using CryoStor CS10 branded cell cryopreservation freezing medium.

In an embodiment of the present disclosure, there is provided an in-vitro unified process for obtaining proximal lung epithelial cells and distal lung epithelial cells from human pluripotent stem cells as described herein, wherein the human pluripotent stem cells is human induced pluripotent stem cells (hIPSC).

In an embodiment of the present disclosure, there is provided an in-vitro unified process for obtaining proximal lung epithelial cells and distal lung epithelial cells from human pluripotent stem cells as described herein, wherein the human pluripotent stem cells is human embryonic stem cells (hESC).

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may vary.

The present section provides a method for obtaining proximal lung epithelial cells and distal lung epithelial cells from human induced pluripotent stem cells (hiPSCs). The method has been divided into three steps, namely, (i) definitive endoderm (Day 0-10); (ii) anteriorization (Day 10-17); and (iii) distal/proximal lung progenitors (Day 17-25).

Culture and Maintenance of Human iPSC Cultures

The standard procedure as previously reported was used to culture and expand human iPSC (Banerjee et al., 2018, *Stem Cells,* 36(2), 218-229). Three cell lines were used for the experiments reported here, namely the XCL-ER2.2-GFP, NCL1 lines, and TC-1133, for reproducibility. Both XCL-ER2.2-GFP and NCL1 cell lines were procured from XCell Science, Novato, California, with documentation showing the cells to have a normal karyotype and have passed basic quality control testing. The cell line TC-1133 was procured from Rutgers University, New Jersey, United States. The use of human iPSCs in this study conforms to the guidelines of the Institutional Committee for Stem Cell Research (ICSCR), the National Apex Committee for Stem Cell Research and Therapy (NAC), the Indian Council of Medical Research (ICMR), and the Department of Health Research, New Delhi, India. This protocol uses commercially available Matrigel branded matrix as the extracellular matrix and mTeSR branded medium as defined culture medium. However, other substrates and media can also be used, which may require optimization (Baghbaderani et al., 2016, *Stem Cell Reviews,* 12, 394-420.; Rao et al., 2018, *Cytotherapy,* 20(6): 861-872; Shafa et al., 2018, *Frontiers of Medicine,* 5, 69.). iPSC cultures were maintained in 10-cm$^2$ culture plates and passaged when they reach 70% to 80% confluency. Cells were split at a ratio of 1:5 using Accutase branded enzyme cell detachment solution or TrypLE branded enzyme solution and quality checked every 7 to 10 passages by phase-contrast microscopy, immunocytochemistry, real-time PCR, and karyotyping. In case of spontaneous differentiation in the cultures, the undesired differentiated areas were manually selected out using a glass-pulled pipette under a stereomicroscope in an aseptic manner. This approach ensured the integrity and purity of the undifferentiated iPSC, which is very important for a starting population.

Materials

Matrigel branded hESC qualified matrix (Corning, 354277), mTeSR branded medium (Stem Cell Technologies, 85850), XCL-ER2.2-GFP or NCL1 iPSC lines (XCell Science), Dulbecco's phosphate-buffered saline (DPBS; ThermoFisher, 14190094), Accutase branded enzyme cell detachment solution (ThermoFisher, A1110501), Y27632 (Tocris, 1254), Activin A (R&D Systems, 338-AC), Differentiation basal medium (see recipe), Tissue culture plates, 2-ml Stripette branded serological pipettes (Corning Costar branded), 15-ml conical tubes (e.g., Corning Falcon), Centrifuge, Microscope, Nonadherent (non-tissue culture) dishes.

Sub-Culturing Human iPSC

1. Matrigel branded matrix was added to the tissue culture plates and incubated under standard culture at least 2 hr before passaging the iPSCs.
2. After 2 hr, Matrigel branded matrix was aspirated out and fresh mTeSR branded medium at 0.2 ml/cm$^2$ surface area of the dish was added.
3. A plate with 70% to 80% confluent iPSC plate for passaging was taken. That should be approximately 120,000 cells per cm$^2$
4. The spent medium was aspirated and washed each plate with 0.1 ml of DPBS/cm$^2$. This step was repeated three times with fresh DPBS.
5. Pre-warmed (at 37° C.) Accutase branded enzyme cell detachment solution at 0.1 ml/cm$^2$ was added, and the plate was swirled to distribute evenly, and transferred to the incubator.
6. The culture was monitored every 2 to 3 min to observe if cells have started lifting off.

Once groups of cells start detaching from the colonies, neutralize the Accutase branded enzyme cell detachment solution with 0.2 ml/cm$^2$ mTeSR branded medium by adding it gently to the plates.

7. All the colonies were removed together from the plate without too much pipetting; it is best to use 2-ml Strippette serological pipettes.
8. The plate was flushed a few times to collect all the cells; take the cell suspension in 15-ml conical tubes.
9. The cells were centrifuged for 2 to 3 min at 200×g, room temperature.
10. The medium was aspirated without disturbing the cell pellet. To the pellet, 0.2 ml/cm$^2$ fresh mTeSR branded medium with 10 µM Y27632 (RevitaCell branded supplement can alternatively be added) was added and mixed the cells with minimal pipetting so that the colonies do not break completely.

Retaining the cells as small colonies is always better.

11. The cells were evenly distributed in freshly coated tissue culture plates (see step 1) at 3000 cells per cm$^2$. Swirl the plate back and forth to ensure regular spacing between colonies. Also, the plate was observed under a microscope to see if the cells are plated as groups of 10 to 20 cells.
12. The cells were incubated under standard culture conditions and change the medium every day until cells become ready for the next passage in around 4 to 7 days.

Formation of Embryoid Bodies

Embryoid bodies (EBs) are three-dimensional clusters of iPSCs in suspension, formed by forced aggregation that can eventually give rise to all three germ lineages—ectoderm, endoderm, and mesoderm. Undifferentiated cultures of iPSCs are plated onto ultra-low attachment, non-tissue culture dishes for the generation of EBs; these EBs closely mimic the gastrulation phase of an embryo (Leahy, Xiong, Kuhnert, & Stuhlmann, 1999, *The Journal of Experimental Zoology*, 284, 67-81.) and mark the initiation of the differentiation program. Cells are generally seeded at high density to facilitate good-quality EB formation. The cultures were gradually switched from mTeSR branded medium to differentiation medium.

13. The cells from step 10 were centrifuged as described in step 8, and gently resuspended the cells in mTeSR branded medium by slow pipetting.
14. The cells were seeded uniformly onto nonadherent plates at 0.12-0.15×10$^6$ cells per cm$^2$ with 10 µM Y27632, and keep the plates in the incubator.
15. The plates were not disturbed for the next 24 hr.
16. After 24 hr, the plates were observed and changed the medium to 50% mTeSR branded medium/50% differentiation basal medium with 20 ng/ml Activin A.
17. On the following day, switched over to differentiation basal medium with 20 ng/ml Activin A and maintained as suspension cultures for next 24 to 48 hr.

Step-1 Induction to Definitive Endoderm (Days 0-10)

The endoderm that gives rise to the lung is sandwiched between the other two germ layers. During lung development, the epithelial and mesenchymal skeleton drives morphogenesis through a complex circuit of signaling pathways and patterning of the airway structure. The first stage in lung development is early specification of anterior foregut endoderm with mesodermal progenitors, which develops soon after gastrulation (Herriges et al., 2014, *Development*, 141, 502-513.). With the help of Activin A, a member of TGF-beta superfamily, and BMP-4, the cells were cued to form the endoderm layer that eventually gives rise to the lung cells.

NOTE: Freshly prepared differentiation basal medium is recommended for the optimal growth of cells. Once B27 supplement and Albumax branded lipid-rich bovine serum have been added to the medium, it should be used within 7 days, as the components might undergo crystallization and hamper interaction with the cells. Growth factors/recombinant factors or small molecules should be added only at the time of use. Adding them to the basal medium and storing at 4° C. might have an adverse effect on the shelf life and reactivity.

Materials

Embryoid Bodies

Differentiation basal medium, Definitive endoderm medium (DE)
growth factors
Anteriorization medium growth factors
0.5% Matrigel branded matrix-coated plates 1. After 3 days in suspension, the EBs were plated onto 0.5% Matrigel branded matrix coated plates at 7 EBs per cm$^2$ of culture surface in DE medium.

DE medium is differentiation basal medium supplemented with DE growth factors [150 ng/ml Activin A and 25 ng/ml bone morphogenic protein 4 (BMP4)].

2. The cultures were fed with freshly prepared DE medium for 5 days.

During this time, pockets of epithelial progenitors emerge out of the darker EB centers.

Step-2 Anteriorization of DE (Days 10 to 17)

The anterior-posterior patterning of the DE into distinct domains is controlled by a variety of signalling interactions between the DE and its surrounding mesoderm. Embryonic progenitors of endodermal origin are important intermediates in the protocol of the present disclosure since they give rise to all mature parenchymal cells in the end. Hence, the DE cells generated from the preceding step are subjected to anteriorization with epidermal growth factor (EGF) and propagated with the help of the signalling molecule basic fibroblast growth factor (FGF). Lung endoderm fate is marked by the expression of the TF NKX2.1, which starts appearing as early as day 4 of differentiation (Herriges et al., 2014). This specification step mimics the embryonic phase of lung development and can be correlated with the formation of primitive lung buds in-vivo.

3. The epithelial-like pockets were characterized for their abundance of DE markers: FOXA2, SOX17. Successful DE induction should indicate more than 70% positivity.

4. The cultures were switched to anteriorization medium [differentiation basal medium supplemented with anteriorization medium growth factors (50 ng/ml EGF and 50 ng/ml bFGF to promote the expansion of epithelial progenitor cells and 3 μM SB431542 and 10 ng/ml Noggin for dual SMAD inhibition)].

5. The cells were maintained in this stage for 5 days with medium change every day.

Step-3 Generation of Lung Progenitors (Days 17-25)

The lung buds are surrounded by a bed of mesenchymal cells and start branching as the respiratory tree through proximal-to-distal patterning of epithelial cells. The epithelial progenitor cell distribution and symmetry across the distal and proximal axis are variable, and the role of these cells in the micro-environment has been largely unexplored. The cellular and extra-cellular matrix comprising both these cell types and their interaction with signaling pathways is highly discrete, and is also responsible for their specific functions.

NKX2.1-positive cells representing anteriorized foregut endoderm cells are acritical prerequisite to generating good-quality airway and lung progenitors in vitro. In general, similar to other iPSC-derived lineages, one may choose to overexpress the key TF NKX2.1 in the undifferentiated iPSCs for producing a heterogenous population of lung epithelial cells. Nevertheless, in the protocol described in the present disclosure, good results were obtained simply by employing the growth factor/small molecule-mediated induction approach.

Materials

Differentiation basal medium and Proximal and distal specification medium growth factors are provided below.

Differentiation Basal Media (for 50 ml)

1. DMEM/F12 1:1 (Thermofisher)—47.5 ml
2. 1× Non-Essential Amino Acids (NEAA) (Thermofisher)—0.5 ml
3. 1× GlutaMAX branded supplement (Thermofisher)—0.5 ml
4. 10% Albumax branded lipid-rich bovine serum (Sigma)—500 μl
5. 50× B27—1 ml To the basal medium, the following components are to be added at different stages of differentiation.

| | |
|---|---|
| Definitive endoderm | 150 ng/ml Activin A (R&D systems) |
| | 25 ng/ml BMP4 (Thermofisher) |
| | 10 μM Y27632 (Tocris) |
| Anteriorized endoderm | 50 ng/ml EGF (Thermofisher) |
| | 50 ng/ml bFGF (Thermofisher) |
| | 3 μM SB431542 (Thermofisher) |
| | 10 ng/ml Noggin (Sigma) |
| Proximal lung epithelium | 50 ng/ml Noggin (Thermofisher) |
| | 50 ng/ml BMP7 (Thermofisher) |
| | 30 ng/ml FGF7 (Thermofisher) |
| | 3 μM CHIR99021 (Stem cell technologies) |
| | 50 ng/ml PD032519 (Tocris) |
| | 50 ng/ml Retinoic acid (Thermofisher) |
| Distal lung epithelium | 50 ng/ml BMP2 (Thermofisher) |
| | 50 ng/ml BMP4 (Thermofisher) |
| | 50 ng/ml bFGF (Thermofisher) |
| | 50 ng/ml FGF10 (Thermofisher) |
| | 50 ng/ml WNT3A (R&D systems) |

Specification to Proximal Lung Epithelial Cells

As the lung branches, it recapitulates the transition from the pseudo-glandular to the canalicular phase. The proximal progenitor cells lining the epithelial stalk give rise to upper airway cells including secretory Clara cells, ciliated cells, and neuroendocrine cells. The proximal cell fate is promoted by a specific TF, SOX2.

1. These bipotential anteriorized foregut endoderm cells positive for NKX2.1 were taken for differentiation to proximal progenitors.

2. These cells were switched to proximal differentiation medium [differentiation basal medium supplemented with proximal specification medium growth factors (50 ng/ml BMP7, 30 ng/ml FGF7, 50 ng/ml PD032519, 50 ng/ml retinoic acid, 50 ng/ml Noggin, and 3 μM CHIR99021)].

3. The medium was changed every day for the next 7 to 10 days.

4. The proximal lung progenitors give rise to airway epithelial cells: neuroendocrine (NE) cells, secretory cells, ciliated cells, and mucosal cells.

Specification to Distal Lung Epithelial Cells

The last phases of lung development represent the saccular and alveolar stages that mimic the distal epithelium formation. They are marked by co-expression of NKX2.1 and SOX9. These distal lung progenitors give rise to alveolar epithelial cells—type I and type II—which help in alveolar gas exchange. Interestingly, type II alveolar epithelial cells turnout to be the natural precursors for their type I counterparts, and play a crucial role in lung regeneration.

5. These bipotential anteriorized foregut endoderm cells positive for NKX2.1 were taken for differentiation to distal progenitors.

6. The cells were switched to distal differentiation medium [differentiation basal medium supplemented with distal specification medium growth factors (50 ng/ml BMP2, 50 ng/ml FGF10, 50 ng/ml BMP4, 50 ng/ml bFGF, and 50 ng/ml WNT3A)].

7. The medium was changed every day for next 7 to 10 days.

8. The distal lung progenitors largely give rise to type I and type 2 alveolar epithelial cells (AEC 1 and AEC 2).

Eliminating Spontaneously Differentiated Cells from iPSC Cultures

Materials
  iPSC culture (see protocols above)
  Object marker
  Pipet tip or glass pulled pipette 1. The human iPSC cultures were monitored regularly for spontaneously differentiated cells if any.

2. Differentiated population can be distinguished from iPSCs by the absence of cells with high nuclear-to-cytoplasmic ratio and shining borders; rather it will comprise denser, multilayered, randomly arranged cells forming a darker center.

3. An object marker was used to mark differentiated areas under the microscope.

4. The plate was carefully transferred to a biosafety cabinet and the marked areas were very carefully removed using a pipette tip or glass pulled pipette in an aseptic manner.

5. The rest of the good iPSC colonies can be split.

6. A good or pure population of starting iPSC is extremely important for successful differentiation.

Pluripotent stem cells are undifferentiated cells which, during the course of growth and expansion, might give rise to a differentiated population along with the desired iPSC population. To obtain good differentiation, it is imperative to remove these areas of undesired non-stem cells from the tissue culture plate manually (under microscope) or by spot trypsinization.

7. Immunocytochemistry and real-time polymerase chain reaction (RT-PCR). For immunofluorescence, fix the cells in 2% paraformaldehyde, then block with 4% serum and stain with antibodies followed by counterstain using DAPI as reported in Surendran, Rathod, & Pal (2018). For real-time PCR, lyse the cells in TRIZOL branded reagent (Sigma) and isolate total RNA with Qiagen RNA extraction kit. After quantification, take 500 ng of RNA and subject it to reverse transcription to make cDNA with the Revert AID kit followed by real-time PCR with gene primers of interest. Export the CT values from the thermal cycler and calculate relative expression as described earlier (Surendran et al., 2018 *Methods in Molecular Biology*). Details of the antibodies and primers used in this protocol are given in Tables 1 and 2, respectively.

TABLE 1

List of Antibodies Used for Immunocytochemistry

| Antibody name | Manufacturer | Cat. no. | Working dilution |
|---|---|---|---|
| CC10 | Millipore | 07-601 | 1:200 |
| FOXA2 | BD Pharmingen | BD561580 | 1:200 |
| Ki-67 | Millipore | MAB4190 | 1:300 |
| NANOG | Abcam | ab62734 | 1:300 |
| NKX2.1 | Upstate | 07-624 | 1:200 |
| OCT4 | Abcam | AB19857 | 1:300 |
| PAX8 | Millipore | MAB10134 | 1:200 |
| PITX2 | Abcam | ab98297 | 1:200 |
| Rhodamine phalloidin | ThermoFisher | R415 | 1:400 |
| SOX2 | Abcam | ab171380 | 1:300 |
| SP-C | Millipore | AB3786 | 1:100 |
| TRA-1-60 | Millipore | MAB4360 | 1:300 |
| TUJ1 | Millipore | MAB1637 | 1:200 |
| ZO-1 | BD Pharmingen | 610966 | 1:200 |
| SOX9 | Millipore | AB5535 | 1:200 |
| FOXJ1 | ThermoFisher | 14-9965-80 | 1:200 |
| FOXP2 | ThermoFisher | 720031 | 1:200 |
| Anti-mouse 594 | Abcam | ab150116 | 1:500 |
| Anti-rabbit 594 | Abcam | ab150080 | 1:500 |
| Anti-rabbit 488 | ThermoFisher | A-11034 | 1:500 |
| Anti-mouse 488 | ThermoFisher | A32723 | 1:500 |

TABLE 2

List of Primers Used for Real-Time PCR

| Gene name | Forward primer sequence | Reverse primer sequence |
|---|---|---|
| β-actin | TCACCCACACTGTGCCCATCTA (SEQ ID NO: 1) | CAGCGGAACCGCTCATTGCCAAT (SEQ ID NO: 2) |
| FOX A2 | CATCTCGCTCATCTCCATGG (SEQ ID NO: 3) | CAGCGTCAGCATCTTGTTGG (SEQ ID NO: 4) |
| FOX J1 | CTACTCGTATGCCACGCTCA (SEQ ID NO: 5) | GGCGGAAGTAGCAGAAGTTG (SEQ ID NO: 6) |
| NKX2.1 | CACACGACTCCGTTCTCAGTGT (SEQ ID NO: 7) | GCCCACTTTCTTGTAGCTTTCC (SEQ ID NO: 8) |
| OCT4 | GTACTCCTCGGTCCCTTTCC (SEQ ID NO: 9) | CAAAAACCCTGGCACAAACT (SEQ ID NO: 10) |
| SOX17 | AGCTCAGCGGTCTACTATTGCA (SEQ ID NO: 11) | GGTCGGCAACCGTCAAAT (SEQ ID NO: 12) |
| SOX2 | ACACCAATCCCATCCACACT (SEQ ID NO: 13) | GCAAACTTCCTGCAAAGCTC (SEQ ID NO: 14) |
| SOX9 | AAGAGGCCACGGAACAGACTCA (SEQ ID NO: 15) | GACCCTGAGATTGCCCAGAGTG (SEQ ID NO: 16) |
| SP-C | GCAAAGAGGTCCTGATGG (SEQ ID NO: 17) | CACCACGACGATGAGGAC (SEQ ID NO: 18) |

Critical Parameters and Troubleshooting

Passaging Undifferentiated iPSCs

Maintaining iPSC without spontaneous differentiation is critical for good differentiation. Characterize and quality-check to be done for the iPSC every 5 to 7 passages through routine assays (e.g., gene expression, antibody staining, alkaline phosphatase assay, karyotype, and freezethaw viability of cryopreserved vials). During splitting, pre-warm the required amount of pre-warmed Accutase branded enzyme cell detachment solution for 5-10 min. This aids in cell detachment, thereby lessening exposure of these sensitive cultures to Accutase branded enzyme cell detachment solution.

Differentiation into Lung Epithelium

It is made sure that EBs are scattered evenly and not clustered at one corner of the plate, as the distribution pattern is crucial for expected cellular outgrowth. There should be around 20 to 25 EBs per 10 cm² for a good differentiation outcome. Since this protocol does not involve any splitting or passaging during the differentiation process, it is necessary to keep the EB number low at the beginning. Another issue with a higher EB number is the unwanted formation of large mounds, leading to inadequate interaction of the cells with the growth medium containing the key growth factors and resulting in skewed differentiation. In such a scenario, it is common to observe more mesenchymal looking cells than epithelial pockets.

The protocol as disclosed in the present disclosure yields >70% SOX2- and FOXJ1-positive proximal lung progenitors and >70% SOX9- and SP-C-positive distal lung progenitors that can be further differentiated until maturity. The initial stage of DE induction is very crucial and determines the fate of the final product. The cells first arising from EBs would be cuboidal in shape with a large spherical nucleus at the center that has defined boundaries. At this stage, the cells should be strongly positive for FOXA2 and SOX17. Beyond this point, the density of EB centers would become reduced, followed by the prolific outgrowth of the epithelial-like population (with 70% NKX2.1-positive cells) that would eventually spread across the tissue culture plate. All other non-lung-cell types would be gradually eliminated during medium change, due to selection pressure. The proximal and distal epithelial cell population is expected to generate more than 70% to 80% airway and alveolar cell types characterized by an abundance of SOX2, FOXJ1, ARL13B, and SOX9, FOXP2, and SP-C, respectively.

Results

Understanding the spatio-temporal regulation of key signaling mechanisms in lung development laid the foundation for creating the differentiation procedure described in the present disclosure. The embryonic stage shows the formation of the tracheal bud, which happens at the beginning of the 4$^{th}$ week. The trachea branches to bronchial buds during the pseudo-glandular stage at the end of the 4$^{th}$ week. The trachea bifurcates in the canalicular stage, forming respiratory bronchioles and the air-blood barrier. Clusters of sacs formed from terminal bronchioles and expansion of air spaces appear in the saccular stage. Secondary septation occurs in the alveolar stage, and that starts during gestation and continues until early childhood.

The protocol as described herein, has been designed to differentiate and characterize human iPSC to lung progenitors by simulating the in vivo milestones and taking into consideration the key signaling pathways and molecules involved therein.

Culturing and Maintenance of Human iPSC

Human iPSCs were characterized morphologically by the presence of compact colonies with a high nuclear-to-cytoplasmic ratio and their ability to form EBs. This suggested that the cells are pluripotent and have the ability to undergo in vitro differentiation into three lineages. When immunostained against key TFs-OCT4, NANOG and surface marker TRA-1-60 consistent expression was observed. Cells were tested for karyotypic abnormality through GTG banding every 7 to 10 passages and found to be normal.

Differentiation and Characterization of Lung Epithelial Progenitor Cells

EBs were plated and the cells were induced to endodermal lineage with Activin A and BMP-4. The indicator of success for this stage was that the protocol as disclosed showed the expression of FOXA2. The presence of undifferentiated cells was also checked in these DE cultures with OCT4 and found them to be very minimal.

The committed DE cells were further enriched in the next stage using suitable factors, and the anteriorization of the foregut endoderm was characterized by an abundance of NKX2.1 expression. The temporal activation of the key downstream signalling gene PITX2 was clearly identified during differentiation; Ki-67 staining helped in characterizing the proliferating cell population, indicating the enrichment in committed DE cell population. Also, cultures were checked for neuroectodermal cells (because they are the default pathway) with β-tubulin and found to be negative. Cells after this stage could be prompted to become either distal or proximal progenitors through careful selection of growth factors and small molecules. The proximal cells stained positive for TFs-FOXJ1 and SOX2 with very minimal SOX9, along with tight junction protein ZO-1 and ARL13B representing ciliogenesis and phalloidin. On the other hand, the distal cells stained positive for TFs—FOXP2 and SOX9 with much less SOX2 and were negative for thyroid marker PAX8. Distal cells also stained positive for surfactant protein SP-C and secretory protein CC10. Gene regulation at various stages has been reported here based on fold change and represented as line graphs, supporting the immunostaining results and suggesting successful generation of proximal and distal lung epithelial progenitors using these protocols.

The same procedure has been repeated in yet another cell line and found to be working as well. It is important to note that the second cell line, NCL1 iPSC, is a clinical-grade line that was derived under current Good Manufacturing Practice (cGMP) conditions (Baghbaderani et al., 2016). The same procedure was also repeated in a third cell line TC-1133 which is also an iPSC cell line. NCL1 and TC-1133 are two clones of the same iPSC line. It is to be noted that complete differentiation of airway and alveolar epithelial cells from the iPSC clone (TC-1133) via bipotential lung progenitors establish the reproducibility and robustness of the protocol as described in the present disclosure.

Figure 1:
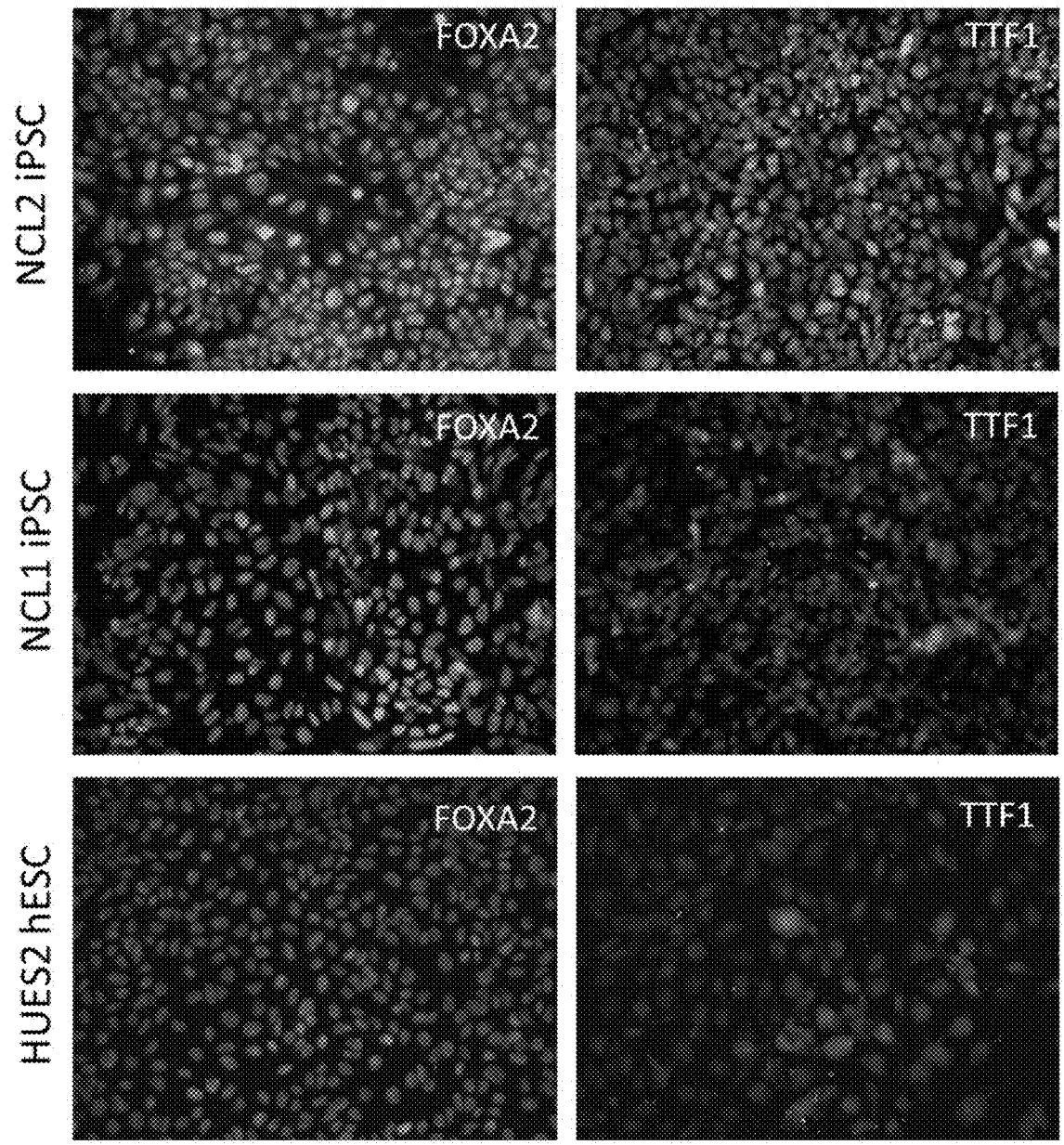
FIG. 1 depicts lung progenitors expressing key anterior endoderm markers FOXA2 and TTF1 (NKX2.1)—these precursor cells can give rise to both distal (alveolar) and proximal (airway) lung epithelial cells depending on the signals provided. NCL2 represents a GFP tagged iPSC line, NCL1 is a control iPSC line and HUES2 is a hESC line, in accordance with an embodiment of the present disclosure.

FIG. 1 represents lung progenitors expressing key anterior endoderm markers FOXA2 and TTF1 (NKX2.1)—these precursor cells can give rise to both distal (alveolar) and proximal (airway) lung epithelial cells depending on the signals provided. NCL2 represents a GFP tagged iPSC line, NCL1 is a control iPSC line, and HUES2 is a hESC line. The results presented herein shows that the process as disclosed is a unified process for obtaining distal (alveolar) and proximal (airway) lung epithelial cells from common anterior endoderm precursors. Also, the same protocol was empirically tested across hIPSC as well as hESC cell line.

Figure 2:
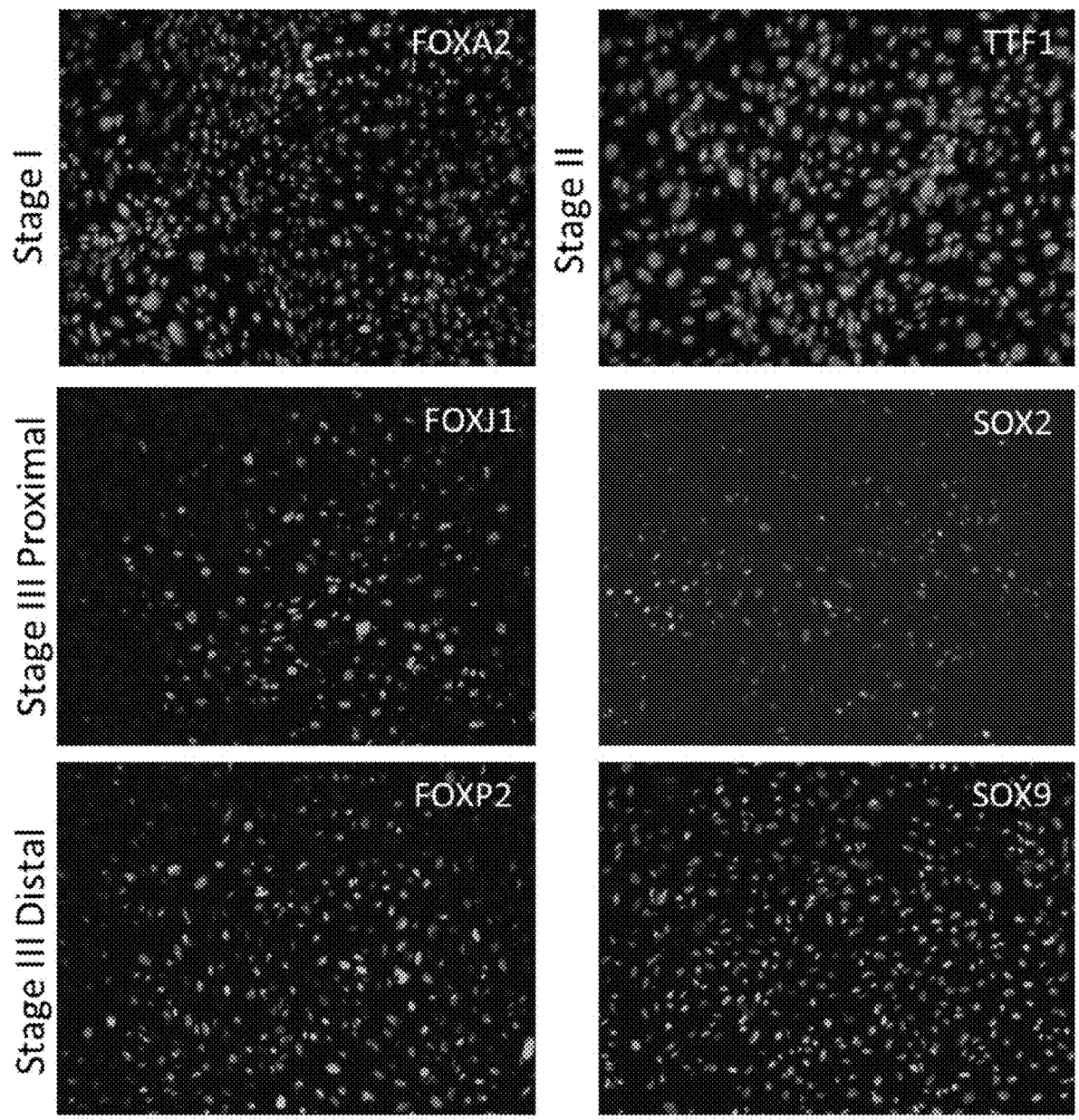
FIG. 2 depicts complete lung differentiation demonstrating stage I definitive endoderm marked by FOXA2, stage II anterior endoderm marked by TTF1, stage III proximal epithelium marked by FOXJ1 and SOX2 and stage III distal epithelium marked by FOXP2 and SOX9. Data from NCL1 iPSC line, in accordance with an embodiment of the present disclosure.

FIG. 2 represents complete lung differentiation demonstrating stage I definitive endoderm marked by FOXA2, stage II anterior endoderm marked by TTF1, stage III proximal epithelium marked by FOXJ1 and SOX2, and stage III distal epithelium marked by FOXP2 and SOX9. Data from NCL1 iPSC line.

FIG. 3 represents that the lung differentiation protocol as disclosed in the present disclosure, can be optimized using Knock Out branded Serum Replacement (KOSR) compared to Albumax branded lipid-rich bovine serum. Key markers like FOXA2 and SPC are expressed in stage II lung epithelial cells derived from the NCL1 iPSC; presence of Ki67 indicates that cells at this stage are still undergoing proliferation to some extent. The replacement of ECM from Matrigel branded matrix to laminin for making this protocol completely xeno-free is an objective to be completed in near future. FIG. 3 is a proof-of-concept to show that the present protocol can be followed using xeno-free approach also.

FIG. 4 shows that lung epithelial cells generated by our protocol can undergo freeze-thaw. Stage II NCL2 iPSC derived lung progenitors show similar morphology and marker expression before and after freezing. Ki67 is a proliferation marker whereas SPC is a lung alveolar epithelial cell marker. The present result, therefore, shows that the protocol as mentioned herein provides the advantage of freezing and thawing the common precursors at stage-2 of differentiation for further applications.

FIG. 5 demonstrates by real-time PCR that the lung differentiation protocol of the present disclosure simulates the gene signature of in-vivo lung development via high expression of early and late lung epithelial cell markers. Further, the data also shows that the protocol of present disclosure stresses the absence of other lineages like ectoderm and mesoderm during differentiation which is a desirable feature.

FIG. 6 depicts the lung progenitors obtained from using the cell line TC-1133 iPSC as a starting point. The bright field images of TC-1133 iPSC line (procured from RUTGERS) were differentiated to lung cells by the protocol as disclosed in the present disclosure. The left panel shows the definitive endoderm (DE) stage with representative Sox-17 immunostaining. The right panel shows the anteriorized endoderm (AE) stage with stage-specific NKX2.1 immunostaining.

FIG. 7 depicts the formation of proximal airway epithelial cells obtained from bipotential AE lung progenitors by using TC-1133 as the starting point. The top panel depicts the bright field images of the proximal airway epithelial cells. The bottom two panels depict the immunostaining images of the proximal airway epithelial cells. The bottom panel images show that the key transcription factor-SOX9, Goblet cell marker—FOXJ1, Ciliated cell marker—ARL13B and Tight Junction protein—ZO-1 are expressed by the proximal airway epithelial cells obtained by the protocol of the present disclosure.

FIG. 8 depicts the formation of distal alveolar cells obtained from bipotential AE lung progenitors by using TC-1133 as the starting point. The top panel depicts the bright field images showing distal alveolar epithelial cells obtained from bipotential AE lung progenitors. The two bottom panels depict immunostaining images showing key transcription factor-SOX2, and Clara cell secretory protein-CC10.

FIG. 9 depicts the electron microscopic images of proximal airway epithelial cells and distal alveolar cells obtained from bipotential AE lung progenitors by using TC-1133 as the starting point. Ciliation can be clearly observed from the top panel images pertaining to proximal airway epithelial cells. Whereas, lamellar bodies can be clearly observed from the bottom panel images pertaining to distal alveolar cells. Therefore, the process of the present disclosure was proven to give rise to proximal airway epithelial cells as well as to distal alveolar cells.

FIG. 10 depicts the mRNA sequencing analysis showing fold change for key lung development genes represented as heat map across various stages of differentiation starting from undifferentiated iPSCs (TC-1133). Total RNA from all samples isolated using standard protocol underwent quality checks and was subjected to directional RNAseq library construction on Illumina HiSeq platform (Illumina, San Diego, California. For the RNAseq data analysis, the unwanted sequences were removed using Bowtie2 and paired-end reads were aligned using HISAT2 program, which were further used to estimate expression of the transcripts using cufflinks program and reported as FPKM (Fragment per kilo per million) units. Principle component analysis (PCA) and hierarchical clustering were performed with the normalized RNAseq data to find the correlation between the samples. The Differential expression gene (DEG) analysis was performed by calculating the logarithmic fold change in comparison with the iPSC sample. Furthermore, Gene Ontology enrichment analysis was carried out using Amigo2 for DEGs. Pathways classification was performed and overlap was made out of these results using VENNY2.1 to identify a common pool of key genes. Data is represented as heat maps using OMICS data analysis support through XLSTAT add-in feature of Microsoft excel. The red color shows a lower expression of genes, whereas the green color shows a higher expression of genes. The different stages of the cells show the spatial development, and the expression shows the temporal changes, therefore, the heatmap provides the spatio-temporal analysis of the genes at different phases of cell culture. Few of the genes which showed a differential behavior during various stages of differentiation are mentioned below.

Definitive endoderm (DE): FOXA2, CXCR4, SOX17, GATA6, CEBPA

Anteriorized endoderm (AE): NKX2.1, SPDEF, SCGB1A1, SCGB2A2, TTF1, NKX2.5

Epithelial cells: ZO-1, KRT15/18/19, EPCAM

Alveolar cells (DAC): SOX2, MUC2, MUC16, MUC5AC, SFTPC, SFTPD, CFTR

Airway cells (PAC): SOX9, FOXJ1, AQ5, TP63, FOXP1

Signaling molecules: WNT3A, CTNNB1, FGF10, FGF18, BMP4, NOTCH1

Other lineages (negative expression in lung): NGFR, TUBB3A, PAX6, PAX8

FIG. 11 depicts the air liquid interface cultures of proximal airway epithelial cells obtained by using TC-1133 iPSCs as the starting point. Using air-liquid interface (ALI) cultures, attempts were made to recreate the pseudo-stratified structure of the lung airway including tight junctions, cilia, and mucin production, thus replicating the in vivo cellular-environmental niche. Furthermore, ALI system supports the structural and functional differentiation of lung epithelial cells. In this technique, the proximal airway epithelial cells were grown in 2-D, and re-plated on transwell chambers for differential enrichment using airway basal media. The culture media was added only in basal side while the apical side was exposed to air. The re-oriented columnar cells (upper air-exposed layer) and basal cells (bottom layer-media exposed) are then proliferated to achieve desired confluency. In this manner, ALI cultures exhibit functional properties like ciliation, transepithelial electrical resistance, and polarized mucin secretion which represents a physiologically relevant/closer in vitro model for disease modelling (for example SARS-COV-2 infection), drug screening (including anti-SARS-COV-2 screening) and cell replacement therapy. The Z-stack images obtained by Confocal microscopy clearly shows the ciliated cells on the upper surface and basal cells in the bottom layer marked by appropriate protein markers which proves the application of the protocol as disclosed in the present disclosure.

Overall, the results presented herein describes that by following the protocol disclosed in the present disclosure, the pluripotent stem cells can be cued to obtain proximal airway epithelial cells, and distal alveolar cells. The process involves differentiating the pluripotent stem cells to definitive endoderm which gives rise to bipotential anteriorized endoderm, wherein the bipotential anteriorized endoderm gives rise to proximal airway epithelial cells and distal alveolar cells. The Lung endoderm fate is marked by the expression of transcription factor-NKX2.1, which starts appearing as early as day 4 of differentiation. The epithelial progenitor cell distribution and symmetry across the distal and proximal axis is variable. The cellular and extra-cellular matrix comprising both these cell types and their interaction with signalling pathways are highly distinct and is also responsible for their specific functions. The protocol as per the present disclosure was able to generate proximal and distal lung precursors from NKX2.1 positive bipotential lung progenitors by mimicking the roles of specific pathways involved in the processes. The proximal growth media contains BMP7, FGF7 coupled with WNT activator, endogenous BMPi and MEKi. The proximal progenitor cells lining the epithelial stalk gives rise to upper airway cells including secretory clara cells, ciliated cells and neuroendocrine cells. The proximal cell fate is promoted by a specific transcription factor, SOX2. The distal growth media contains BMP2, BMP4 along with basic FGF and KGF2. They are marked by co-expression of NKX2.1 and SOX9. These distal lung progenitors give rise to alveolar epithelial cells-type I and type II which help in alveolar gas exchange. Interestingly type II alveolar epithelial cells turn out to be the natural precursors for their type I counterparts and play a crucial role in lung regeneration. In the mammalian lung, type II cells can undergo division to give rise to more type I and type II. So, the focus is in generating type II cells since that is critical. Type I cells are involved in the process of gas exchange, whereas type II cells are involved in the production of surfactant protein. The protocol as described in the present disclosure clearly demonstrated that the distal lung epithelial (alveolar precursor) cells or DAC express SFTPC, CFTR, MUC5AC, etc. which are type II alveolar epithelial cell markers. Therefore, it is evident that the protocol as per the present disclosure gives rise to both Type I and Type II alveolar epithelial cells.

Time Considerations

The experimental volumes and differentiation timelines mentioned here are calculated based on three 60-mm iPSC plates as the starting population and nine 35-mm differentiation plates as the final outcome. iPSC culturing is very similar to embryonic stem cell culturing, and so are the characteristics of the cells obtained. Hence, researchers already working with embryonic stem cells will find iPSC easy to handle. In general, it will take less than 20 min to split the iPSCs enzymatically; however, for beginners, it might take a little longer. Caution should be exercised not to have the cultures outside the incubator for more than 10 min at a stretch. While plating EBs, care should be taken to ensure that there is enough space between EBs so as to allow the epithelial derivatives to radiate out. As mentioned earlier, if the EBs are crowded in one place they may form large clusters which are impermeable to the signals (in form of soluble factors) present in the medium. EB plating will take up to 15 to 20 min. After plating, place the plates gently on the designated deck of the incubator without disturbing the scattered distribution of the EBs. Thereafter, the protocol involves only medium change every day or on alternate days. With all the required factors and consumables on hand, it takes 5 to 10 min to add factors to the basal medium and another 10 to 15 min to change the medium of the differentiation plates. For immunostaining, cells are grown on 4-well plates and harvested at important time points, according to the experimental design. For mRNA analysis, one 35-mm plate of differentiated cells is good for generating 1 to 3 µg of total RNA, and that should be sufficient to test 25 to 30 gene primers by real-time PCR.

Advantages of the Present Disclosure

The present disclosure discloses a protocol that can be used to differentiate hiPSC into lung epithelial cell types through a process that faithfully recapitulates the step-wise events observed in-vivo. From pluripotency, cells are differentiated to a definitive endoderm fate, followed by progression into anteriorized foregut endoderm that has the ability to give rise to both proximal and distal epithelial cells. Furthermore, this methodology allows for the study of lung dysfunction and disease modelling using patient-derived cells, as well as high-throughput pharmacological screening and eventually personalized therapies. The present disclosure also discloses a proof-of-concept of the protocol using a working cell bank of hiPSC line made under Good Manufacturing Practice (cGMP) conditions, which is a necessary step for the future clinical application of these cells. The protocol as disclosed herein, involves a xeno-free practice which provides a great advantage in terms of avoiding any animal-derived substrate. The present disclosure provides a technically advanced protocol in terms of being a xeno-free protocol, because this particular feature makes the protocol GMP compliable. Hence, it saves valuable time and money. Showing data that xeno-free materials work equally well as conventional materials (derived from animals) is a big plus because the animal-derived products have undefined components in them, which is not desirable at the clinical level.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An in-vitro process for obtaining distal lung epithelial cells from human pluripotent stem cells, said process comprising:

a) sub-culturing human pluripotent stem cells to obtain embryoid bodies in a suspension;

b) plating the embryoid bodies onto coated plates in presence of a definitive endoderm medium, and feeding the embryoid bodies with the definitive endoderm medium to obtain definitive endoderm cells;

c) culturing the definitive endoderm cells obtained in step (b) in presence of an anteriorization medium, to obtain bipotential anteriorized foregut endoderm cells; and d) culturing the bipotential anteriorized foregut endoderm cells of step (c) in presence of a distal differentiation medium, to obtain distal lung epithelial cells, wherein the distal lung epithelial cells have an ability to give rise to Type I and Type II alveolar epithelial cells, and wherein the distal differentiation medium comprises BMP2 in a concentration range of 10-75 ng/ml, BMP4 in a concentration range of 10-75 ng/ml, bFGF in a concentration range of 10-75 ng/ml, FGF10 in a concentration range of 10-75 ng/ml, and WNT3A in a concentration range of 10-75 ng/ml.

2. The process as claimed in claim 1, wherein the human pluripotent stem cells are either human induced pluripotent stem cells or human embryonic stem cells.

3. The process as claimed in claim 1, wherein the coated plates are obtained by coating plates with at least one of the components selected from the group consisting of vitronectin, fibronectin, collagen, and laminin-521.

4. The process as claimed in claim 1, wherein the definitive endoderm medium comprises basal medium, non-essential amino acids, activin A in a concentration range of 100-200 ng/ml, and BMP-4 in a concentration range of 10-50 ng/ml.

5. The process as claimed in claim 4, wherein the definitive endoderm medium comprises a lipid-rich bovine serum.

6. The process as claimed in claim 4, wherein the definitive endoderm medium comprises a xeno-free cell culture medium.

7. The process as claimed in claim 1, wherein the anteriorization medium comprises EGF in a concentration range of 10-75 ng/ml, FGF in a concentration range of 10-75 ng/ml, SB431542 in a concentration range of 1-10 μM, and Noggin in a concentration range of 10-50 ng/ml.

8. The process as claimed in claim 1, wherein feeding the embryoid bodies with the definitive endoderm medium is done for a period of 5-10 days.

9. The process as claimed in claim 1, wherein culturing the definitive endoderm cells obtained in step (b) in the presence of the anteriorization medium is done for a period in the range of 4-7 days.

10. The process as claimed in claim 1, wherein culturing the bipotential anteriorized foregut endoderm cells of step (c) in the presence of the distal differentiation medium is done for a period in the range of 7-10 days.

11. The process as claimed in claim 1, wherein the definitive endoderm cells obtained in step (b) express at least one of the markers selected from the group consisting of FOXA2, and SOX17.

12. The process as claimed in claim 1, wherein the bipotential anteriorized foregut endoderm cells are positive for NKX2.1 and Ki67.

13. The process as claimed in claim 1, wherein the distal lung epithelial cells are positive for at least three markers selected from the group consisting of SP-C, SP-B, FOXP2, SOX9, SOX2, and CC10.

14. The process as claimed in claim 1, wherein at least 70% of distal lung epithelial cells obtained from the process are positive for SOX9, FOXP2, and SP-C.

15. The process as claimed in claim 1, wherein the bipotential anteriorized foregut endoderm cells obtained in step (c) are optionally harvested using an animal origin free recombinant enzyme for dissociating adhesive cells and cryopreserved using a cell cryopreservation media.

* * * * *

SEQUENCE LISTING

<160> NUMBER OF SEQ ID NOS: 18

<210> SEQ ID NO 1
<211> LENGTH: 22
<212> TYPE: DNA
<213> ORGANISM: Artificial Sequence
<220> FEATURE:
<223> OTHER INFORMATION: SEQ ID NO: 1 depicts the forward primer
      sequence for B-actin

<400> SEQUENCE: 1
tcacccacac tgtgcccatc ta                                            22

<210> SEQ ID NO 2
<211> LENGTH: 23
<212> TYPE: DNA
<213> ORGANISM: Artificial Sequence
<220> FEATURE:
<223> OTHER INFORMATION: SEQ ID NO: 2 depicts the reverse primer
      sequence for B-actin

<400> SEQUENCE: 2
cagcggaacc gctcattgcc aat                                            23

<210> SEQ ID NO 3
<211> LENGTH: 20
<212> TYPE: DNA
<213> ORGANISM: Artificial Sequence
<220> FEATURE:
<223> OTHER INFORMATION: SEQ ID NO: 3 depicts the forward
      primer sequence for FOX A2

<400> SEQUENCE: 3
catctcgctc atctccatgg                                                20

<210> SEQ ID NO 4
<211> LENGTH: 20
<212> TYPE: DNA
<213> ORGANISM: Artificial Sequence
<220> FEATURE:
<223> OTHER INFORMATION: SEQ ID NO: 4 depicts the reverse
      primer sequence for FOX A2

<400> SEQUENCE: 4
cagcgtcagc atcttgttgg                                                20

<210> SEQ ID NO 5
<211> LENGTH: 20
<212> TYPE: DNA
<213> ORGANISM: Artificial Sequence
<220> FEATURE:
<223> OTHER INFORMATION: SEQ ID NO: 5 depicts the forward
      primer sequence for FOX J1

<400> SEQUENCE: 5
ctactcgtat gccacgctca                                                20

<210> SEQ ID NO 6
<211> LENGTH: 20
<212> TYPE: DNA
<213> ORGANISM: Artificial Sequence
<220> FEATURE:
<223> OTHER INFORMATION: SEQ ID NO: 6 depicts the reverse
      primer sequence for FOX J1

<400> SEQUENCE: 6
ggcggaagta gcagaagttg                                                20

<210> SEQ ID NO 7
<211> LENGTH: 22
<212> TYPE: DNA
<213> ORGANISM: Artificial Sequence
<220> FEATURE:
<223> OTHER INFORMATION: SEQ ID NO: 7 depicts the forward primer
      sequence for NKX 2.1

<400> SEQUENCE: 7
cacacgactc cgttctcagt gt                                             22

```
<210> SEQ ID NO 8
<211> LENGTH: 22
<212> TYPE: DNA
<213> ORGANISM: Artificial Sequence
<220> FEATURE:
<223> OTHER INFORMATION: SEQ ID NO: 8 depicts the reverse primer
      sequence for NKX 2.1

<400> SEQUENCE: 8
gcccactttc ttgtagcttt cc                                              22

<210> SEQ ID NO 9
<211> LENGTH: 20
<212> TYPE: DNA
<213> ORGANISM: Artificial Sequence
<220> FEATURE:
<223> OTHER INFORMATION: SEQ ID NO: 9 depicts the forward
      primer sequence for OCT 4

<400> SEQUENCE: 9
gtactcctcg gtccctttcc                                                 20

<210> SEQ ID NO 10
<211> LENGTH: 20
<212> TYPE: DNA
<213> ORGANISM: Artificial Sequence
<220> FEATURE:
<223> OTHER INFORMATION: SEQ ID NO: 1 depicts the reverse
      primer sequence for OCT 4

<400> SEQUENCE: 10
caaaaaccct ggcacaaact                                                 20

<210> SEQ ID NO 11
<211> LENGTH: 22
<212> TYPE: DNA
<213> ORGANISM: Artificial Sequence
<220> FEATURE:
<223> OTHER INFORMATION: SEQ ID NO: 11 depicts the
      forward primer sequence for SOX17

<400> SEQUENCE: 11
agctcagcgg tctactattg ca                                              22

<210> SEQ ID NO 12
<211> LENGTH: 18
<212> TYPE: DNA
<213> ORGANISM: Artificial Sequence
<220> FEATURE:
<223> OTHER INFORMATION: SEQ ID NO: 12 depicts the reverse
      primer sequence for SOX 17

<400> SEQUENCE: 12
ggtcggcaac cgtcaaat                                                   18

<210> SEQ ID NO 13
<211> LENGTH: 20
<212> TYPE: DNA
<213> ORGANISM: Artificial Sequence
<220> FEATURE:
<223> OTHER INFORMATION: SEQ ID NO: 13 depicts the forward
      primer sequence for SOX 2

<400> SEQUENCE: 13
acaccaatcc catccacact                                                 20
```

```
<210> SEQ ID NO 14
<211> LENGTH: 20
<212> TYPE: DNA
<213> ORGANISM: Artificial Sequence
<220> FEATURE:
<223> OTHER INFORMATION: SEQ ID NO: 14 depicts the reverse
      primer sequence for SOX 2

<400> SEQUENCE: 14
gcaaacttcc tgcaaagctc                                                  20

<210> SEQ ID NO 15
<211> LENGTH: 22
<212> TYPE: DNA
<213> ORGANISM: Artificial Sequence
<220> FEATURE:
<223> OTHER INFORMATION: SEQ ID NO: 15 depicts the forward
      primer sequence for SOX 9

<400> SEQUENCE: 15
aagaggccac ggaacagact ca                                               22

<210> SEQ ID NO 16
<211> LENGTH: 22
<212> TYPE: DNA
<213> ORGANISM: Artificial Sequence
<220> FEATURE:
<223> OTHER INFORMATION: SEQ ID NO: 16 depicts the reverse
      primer sequence for SOX 9

<400> SEQUENCE: 16
gaccctgaga ttgcccagag tg                                               22

<210> SEQ ID NO 17
<211> LENGTH: 18
<212> TYPE: DNA
<213> ORGANISM: Artificial Sequence
<220> FEATURE:
<223> OTHER INFORMATION: SEQ ID NO: 17 depicts the forward primer
      sequence for SP-C

<400> SEQUENCE: 17
gcaaagaggt cctgatgg                                                    18

<210> SEQ ID NO 18
<211> LENGTH: 18
<212> TYPE: DNA
<213> ORGANISM: Artificial Sequence
<220> FEATURE:
<223> OTHER INFORMATION: SEQ ID NO: 18 depicts the reverse primer
      sequence for SP-C

<400> SEQUENCE: 18
caccacgacg atgaggac                                                    18
```